US012624989B2

(12) United States Patent
Oka

(10) Patent No.: US 12,624,989 B2
(45) Date of Patent: May 12, 2026

(54) OPTICAL DETECTOR, OPTICAL RECEIVER, AND OPTICAL TRANSCEIVER

(71) Applicant: FUJITSU OPTICAL COMPONENTS LIMITED, Kawasaki (JP)

(72) Inventor: Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 147 days.

(21) Appl. No.: 18/755,291

(22) Filed: Jun. 26, 2024

(65) Prior Publication Data

US 2025/0012627 A1     Jan. 9, 2025

(30) Foreign Application Priority Data

Jul. 7, 2023    (JP) ................................. 2023-112319

(51) Int. Cl.
　　　*G01J 1/04* 　　　 (2006.01)
　　　*G01J 1/44* 　　　 (2006.01)
(52) U.S. Cl.
　　　CPC .............. *G01J 1/0425* (2013.01); *G01J 1/44* (2013.01)
(58) Field of Classification Search
　　　CPC .... G01J 1/0425; G01J 1/44; G01J 1/42; G01J 1/0407; H04B 10/40; H04B 10/616
　　　See application file for complete search history.

(56) References Cited

U.S. PATENT DOCUMENTS

2019/0391006 A1 　 12/2019 　 Pelletier et al.
2022/0099888 A1* 　 3/2022 　 Sakamoto .............. G02B 6/125

OTHER PUBLICATIONS

Andreas Beling et al., "High-power, high-linearity photodiodes", Optica, vol. 3, No. 3, pp. 328-338, Mar. 2016.
Jishi Cui et al., "The dual-injection Ge-on-Si photodetectors with high saturation power by optimizing light filed distribution", Optics Communications, vol. 480, 2021.
Xiao Hu et al., "High-speed and high-power germanium photodetector with a lateral silicon nitride waveguide", Photonics Research, vol. 9, No. 5, pp. 749-756, May 2021.
Daigao Chen et al., "Broadband, Fabrication-Tolerant Polarization Beam Splitters Based on a Tapered Directional Coupler", IEEE Photonics Technology Letters, vol. 28, No. 19, pp. 2074-2077, Oct. 1, 2016.
Yi Zhang et al., "A high-responsivity photodetector absent metal-germanium direct contact", Optics Express, vol. 22, No. 9, pp. 11367-11375, May 5, 2014.
Chia-Ming Chang et al., "High-power dual-fed traveling wave photodetector circuits in silicon photonics", Optics Express, vol. 23, No. 17, pp. 22857-22866, Aug. 24, 2015.

* cited by examiner

*Primary Examiner* — Georgia Y Epps
*Assistant Examiner* — Monica T Taba
(74) *Attorney, Agent, or Firm* — STAAS & HALSEY LLP

(57) ABSTRACT

An optical detector includes a photodetector that converts signal light into an electric signal, and a mode filter. The photodetector includes a first port to which signal light of a first mode is input, and a second port to which signal light of a second mode is input. The mode filter includes a third port connected to the first port, and a fourth port connected to the second port. The mode filter passes the signal light of the first mode towards the first port to be output from the third port, passe the signal light of the second mode towards the second port to be output from the fourth port, removes the signal light of the second mode from the first port input from the third port, and removes the signal light of the first mode from the second port input from the fourth port.

12 Claims, 24 Drawing Sheets

1C (1)

1

OPTICAL DETECTOR, OPTICAL RECEIVER, AND OPTICAL TRANSCEIVER

CROSS-REFERENCE TO RELATED APPLICATION

This application is based upon and claims the benefit of priority of the prior Japanese Patent Application No. 2023-112319, filed on Jul. 7, 2023, the entire contents of which are incorporated herein by reference.

FIELD

The embodiments discussed herein are related to an optical detector, an optical receiver, and an optical transceiver.

BACKGROUND

In recent years, high-speed and large-capacity communication has been implemented in an optical fiber communication network by using coherent optical communication technology. In an optical receiver using the coherent optical communication technology, after mixing received light the optical power of which has been lowered due to long-distance transmission with local light emission generated inside the optical receiver, the received light after the mixing is converted into a current by a Photo Detector (PD). As a result, the optical receiver enables highly-sensitive reception by reducing influence of thermal noise generated after the PD.

However, in the optical receiver, reception sensitivity is increased as optical power of local light emission is increased, but a response speed of the PD is limited by a space-charge effect when large optical power is input to the PD, so that high-speed communication is difficult to be performed.

In the space-charge effect, when light input to the PD generates electron-hole pairs, an electric field generated in the PD by these carriers works to counteract an applied bias to the PD to reduce the applied bias, and force of carrying the carriers in the PD to the outside of the PD is weakened. As a result, the response speed of the PD is lowered.

Additionally, the space-charge effect becomes remarkable in a case in which the number of electron-hole pairs generated in the PD is large, in other words, in a case in which input power is large. Thus, the space-charge effect can be mitigated by reducing the input power.

As a method for reducing the input power to mitigate the space-charge effect, for example, there is known a method of dividing optical power before being input to the PD and inputting respective pieces of light to the PD from two directions.

In the PD, light is converted into electron-hole pairs while being propagated therein, so that the optical power is reduced as being separated away from a light input unit of the PD. Thus, in a case in which the optical power to be input is divided into two pieces and input to the PD from two directions, light intensity per cross section can be suppressed to be about half, so that influence of the space-charge effect can be reduced. As a result, even if the optical power input to the PD is high, deterioration of the response speed of the PD can be suppressed.

As the PD, for example, a waveguide-type PD is employed. The waveguide-type PD includes a PD integrated on the same substrate and an optical waveguide that guides light, and guides light from the waveguide to the PD to perform conversion of light/current by the PD.

The waveguide-type PD is constituted of a Silicon-On-Insulator (SOI) layer of an SOI substrate and Ge epitaxially grown thereon. In a communication wavelength band, for example, in a C band, a band gap of Ge is narrower as compared with Si, so that light propagated in Ge is converted into electron-hole pairs in Ge, and photoelectric conversion can be implemented by extracting the electron-hole pairs by doped Si or an electrode. A layer for converting light into electron-hole pairs like Ge is called an absorbing layer. The absorbing layer is a portion that has a band gap different from that of the optical waveguide, and absorbs input light to be converted into electron-hole pairs.

As described above, the waveguide-type PD includes the optical waveguide and the PD. The optical waveguide includes an Si substrate, a Buried Oxide (BOX) layer laminated on the Si substrate, an optical waveguide of Si formed on the BOX layer, and a buffer layer covering the BOX layer and the optical waveguide. The optical waveguide of Si is formed on the BOX layer by lithographically etching Si of the SOI layer of the SOI substrate formed of the Si substrate and the BOX layer. The PD includes the Si substrate, the BOX layer, the absorbing layer of Ge, and the buffer layer covering the BOX layer and the absorbing layer. The absorbing layer is connected to the optical waveguide, absorbs signal light from the optical waveguide, and converts the signal light into electron-hole pairs.

The related technologies are described, for example, in: U.S. Patent Application Publication No. 2019/0391006; A. Beling, X. Xie and J. C. Campbell, "High-power high-linearity photodiodes", Optica, vol. 3, no. 3, pp. 328-338, 2016.; Jishi Cui, et al., "The dual-injection Ge-on-Si photodetectors with high saturation power by optimizing light field distribution", Optics Communications, Vol 480, 1 Feb. 2021, 126467; Xiao Hu, et al., "High-speed and high-power germanium photodetector with a lateral silicon nitride waveguide", Photonics Research Vol. 9, Issue 5, pp. 749-756 (2021); Daigao Chen, et al., "Broadband, Fabrication-Tolerant Polarization Beam Splitters Based on a Tapered Directional Coupler", IEEE PHOTONICS TECHNOLOGY LETTERS, VOL. 28, NO. 19, Oct. 1, 2016; Yi Zhang, et al., "A high-responsivity photodetector absent metal-germanium direct contact", Optics Express Vol. 22, Issue 9, pp. 11367-11375 (2014); and Chia-Ming Chang, et al., "High-power dual-fed traveling wave photodetector circuits in silicon photonic", Optics Express, Vol 23, 24 Aug. 2015, 22857.

In a case of inputting light to the waveguide-type PD from two directions, residual light that has not been converted into electron-hole pairs in the absorbing layer in the PD is output from a port different from an input port. As a result, the residual light output from the different port flows backward to be reflected light. When the reflected light is further reflected in an external optical device, Fabry-Perot resonance is caused, a photoelectric current varies due to variation of a wavelength, a temperature, and the like, and stability of the optical receiver is lowered.

Such backflow of the residual light in the absorbing layer of the PD is caused mainly because light that has not been completely absorbed in the absorbing layer of Ge passes through the absorbing layer of Ge as the residual light.

Thus, in the waveguide-type PD, the residual light may be reduced by increasing the length of the absorbing layer of Ge to be able to absorb all pieces of light. However, considering that the PD operates as a capacitor of an electric circuit, capacitance is increased as the length of the absorbing layer is increased, and an RC time constant is increased. As a result, the response speed is limited.

SUMMARY

According to an aspect of an embodiment, an optical detector includes a photodetector and a mode filter. The photodetector converts signal light into an electric signal and includes two or more ports. The mode filter includes two or more ports. The photodetector includes a first port to which signal light of a first mode is input, and a second port to which signal light of a second mode is input. The mode filter includes a third port connected to the first port, and a fourth port connected to the second port. The mode filter passes the signal light of the first mode towards the first port to be output from the third port, and passes the signal light of the second mode towards the second port to be output from the fourth port. The mode filter removes the signal light of the second mode to be input from the third port, the signal light of the second mode being output from the first port. The mode filter removes the signal light of the first mode to be input from the fourth port, the signal light of the first mode being output from the second port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The disclosed technique is not limited by the embodiments. The embodiments described below may be appropriately combined with each other without causing contradiction.

(a) First Embodiment

Figure 1:
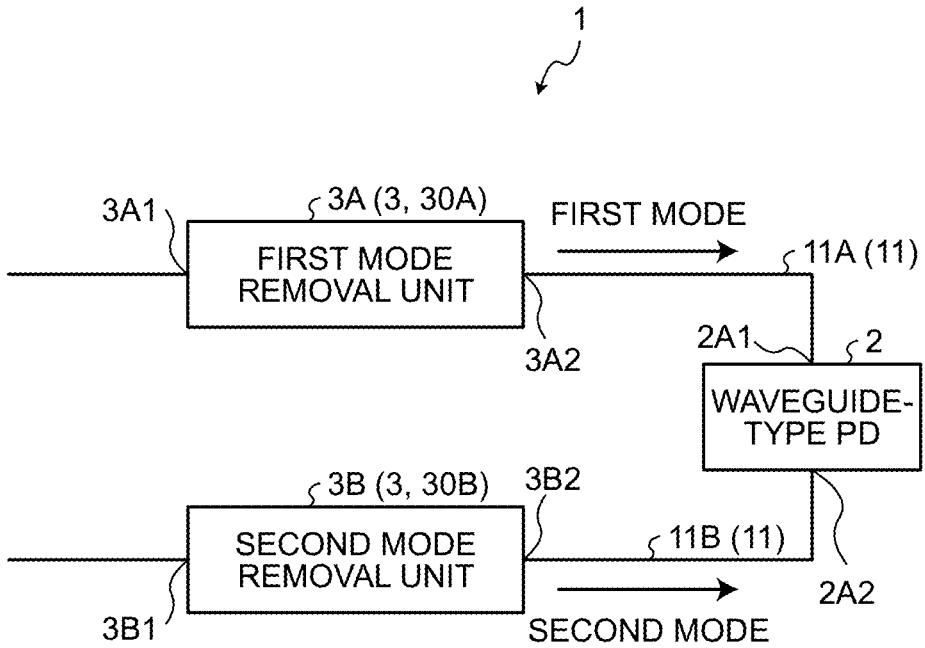
FIG. 1 is a block diagram illustrating an example of an optical detector according to a first embodiment.
Figure 2A:
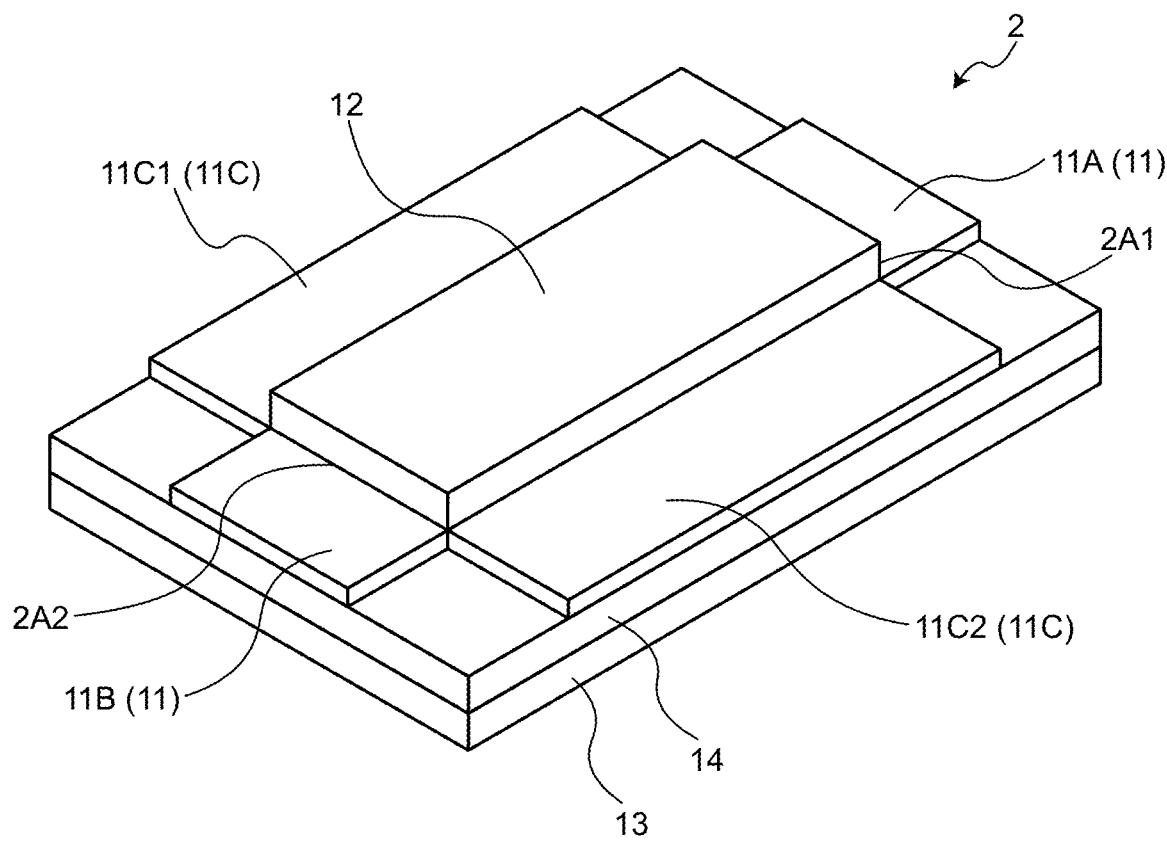
FIG. 2A is a perspective view illustrating an example of a waveguide-type PD.
Figure 2B:
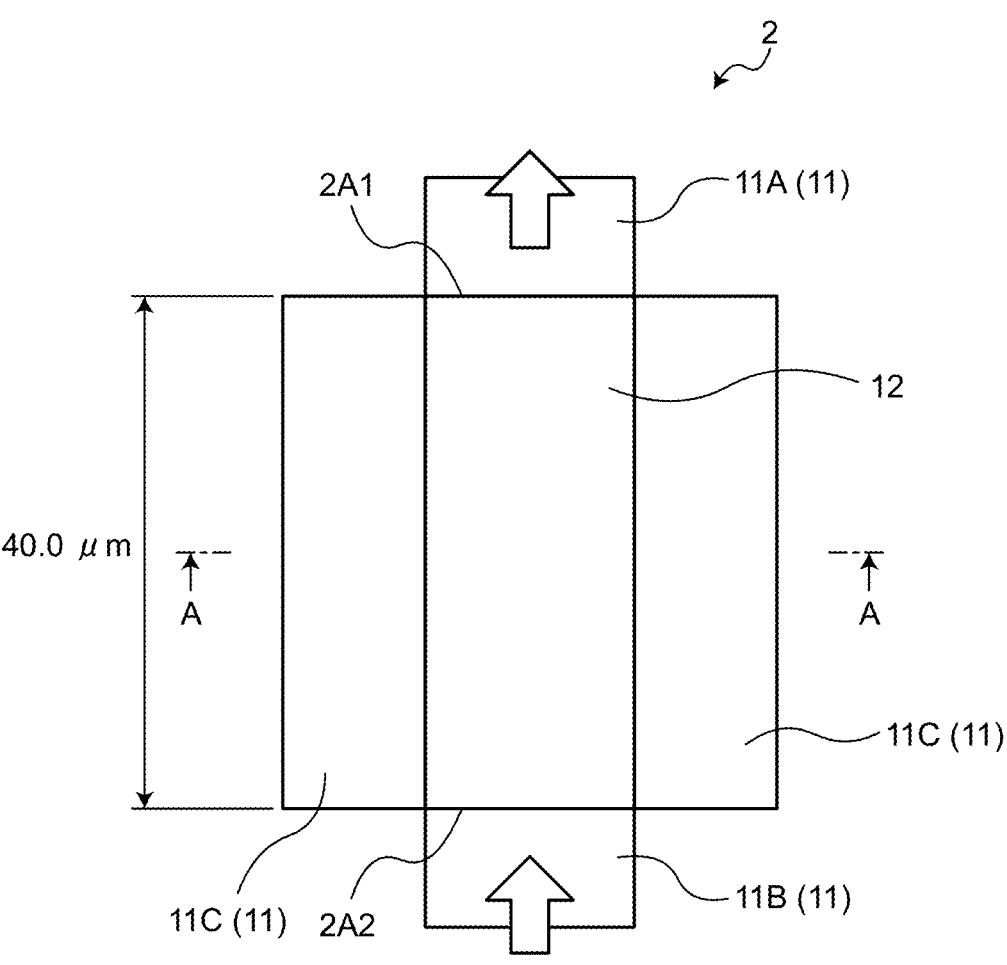
FIG. 2B is a schematic plan view illustrating an example of the waveguide-type PD, which is partially omitted.

FIG. 1 is a block diagram illustrating an example of an optical detector 1 according to a first embodiment, FIG. 2A is a perspective view illustrating an example of a waveguide-type PD 2, and FIG. 2B is a schematic plan view illustrating an example of the waveguide-type PD 2, which is partially omitted. The optical detector 1 illustrated in FIG. 1 includes the waveguide-type PD 2 and a mode filter 3. The mode filter 3 includes a first mode removal unit 3A and a second mode removal unit 3B. The waveguide-type PD 2 includes a first port 2A1 connected to a first input waveguide 11A, a second port 2A2 connected to a second input waveguide 11B, and an absorbing layer 12.

The first mode removal unit 3A includes a first input port 3A1, a first output port 3A2, and a first filter 30A. The first output port 3A2 is connected to the first input waveguide 11A. The first filter 30A is a filter that passes signal light of a first mode from the first input port 3A1, and removes signal light of a second mode from the first output port 3A2.

The second mode removal unit 3B includes a second input port 3B1, a second output port 3B2, and a second filter 30B. The second output port 3B2 is connected to the second input waveguide 11B. The second filter 30B is a filter that passes the signal light of the second mode from the second input port 3B1, and removes the signal light of the first mode from the second output port 3B2. The signal light of the first mode is signal light of the second mode different from the first mode.

The absorbing layer 12 converts the signal light of the first mode input from the first port 2A1 into electron-hole pairs, and converts the signal light of the second mode input from the second port 2A2 into electron-hole pairs.

For convenience of explanation, exemplified is a case in which the first filter 30A removes the signal light of the second mode, but may remove signal light other than the signal light of the first mode. The embodiment can be appropriately changed. Additionally, exemplified is a case in which the second filter 30B removes the signal light of the first mode, but may remove signal light other than the signal light of the second mode. The embodiment can be appropriately changed.

Figure 3:
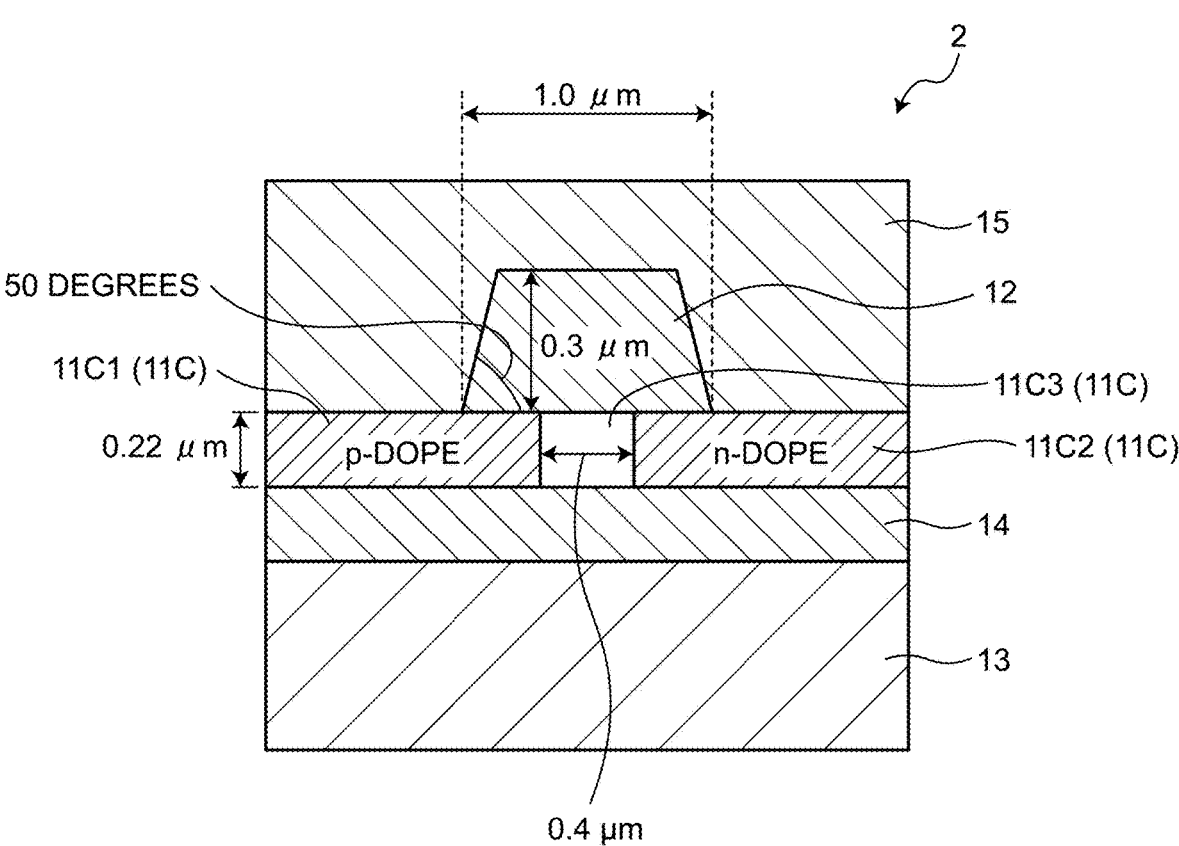
FIG. 3 is a schematic cross-sectional view along a line A-A illustrated in FIG. 2B.

FIG. 3 is a schematic cross-sectional view along a line A-A illustrated in FIG. 2B. The waveguide-type PD 2 illustrated in FIG. 2A, FIG. 2B, and FIG. 3 includes an Si substrate 13, a Buried Oxide (BOX) layer 14 laminated on the Si substrate 13, a waveguide layer 11 laminated on the BOX layer 14, and a buffer layer 15 covering the waveguide layer 11. The Si substrate 13 is a support substrate formed of Si and the like. The BOX layer 14 is a layer of $SiO_2$, for example. The waveguide layer 11 is a waveguide layer formed of Si, for example. The buffer layer 15 is a layer of $SiO_2$, for example. The absorbing layer 12 is an absorbing layer formed of Germanium (Ge), for example.

The waveguide layer 11 includes the first input waveguide 11A, the second input waveguide 11B, and a waveguide 11C connecting the first input waveguide 11A with the second input waveguide 11B. The waveguide 11C includes a p-doped region 11C1, an n-doped region 11C2, and an undoped region 11C3 disposed between the p-doped region 11C1 and the n-doped region 11C2. The absorbing layer 12 is disposed over the undoped region 11C3, part of the p-doped region 11C1 connected to the undoped region 11C3, and part of the n-doped region 11C2 connected to the undoped region 11C3. The first input waveguide 11A and the second input waveguide 11B are disposed on the BOX layer 14. The thickness of the waveguide layer 11 is, for example, 0.22 μm, the width of the undoped region 11C3 is, for example, 0.4 μm, the thickness of the absorbing layer 12 is, for example, 0.3 μm, the width of the absorbing layer 12 is, for example, 1.0 μm, and the length of the absorbing layer 12 is, for example, 40 μm. The dimensions exemplified herein are set only for calculating a Finite-Difference Time-Domain method (described later), and can be appropriately changed.

However, in a case in which part of the signal light of the first mode input from the first port 2A1 is not completely absorbed by the absorbing layer 12 and remains therein, residual signal light of the first mode is output to the second input waveguide 11B through the second port 2A2. Thus, the second filter 30B in the second mode removal unit 3B removes the signal light of the first mode input from the second output port 3B2. Additionally, in a case in which part of the signal light of the second mode input from the second port 2A2 is not completely absorbed by the absorbing layer 12 and remains therein, residual signal light of the second mode is output to the first input waveguide 11A through the first port 2A1. Thus, the first filter 30A in the first mode removal unit 3A removes the signal light of the second mode input from the first output port 3A2. As a result, the optical detector 1 can suppress backflow of the residual light in the absorbing layer 12.

The optical detector 1 according to the first embodiment includes the waveguide-type PD 2 and the mode filter 3. The waveguide-type PD 2 includes the first port 2A1 to which the signal light of the first mode is input, and the second port 2A2 to which the signal light of the second mode is input. The mode filter 3 includes the first mode removal unit 3A and the second mode removal unit 3B. The first mode removal unit 3A passes the signal light of the first mode to the first port 2A1, and removes the signal light of the second mode from the first port 2A1. The second mode removal unit 3B passes the signal light of the second mode to the second port 2A2, and removes the signal light of the first mode from the second port 2A2. As a result, the optical detector 1 can suppress backflow of the residual light in the absorbing layer 12. That is, it is possible to suppress signal light intensity per cross section input to the waveguide-type PD 2, suppress deterioration of the response speed of the waveguide-type PD 2, and suppress noise caused by backflow of the residual light that has not been absorbed by the waveguide-type PD 2.

(b) Second Embodiment

Figure 4:
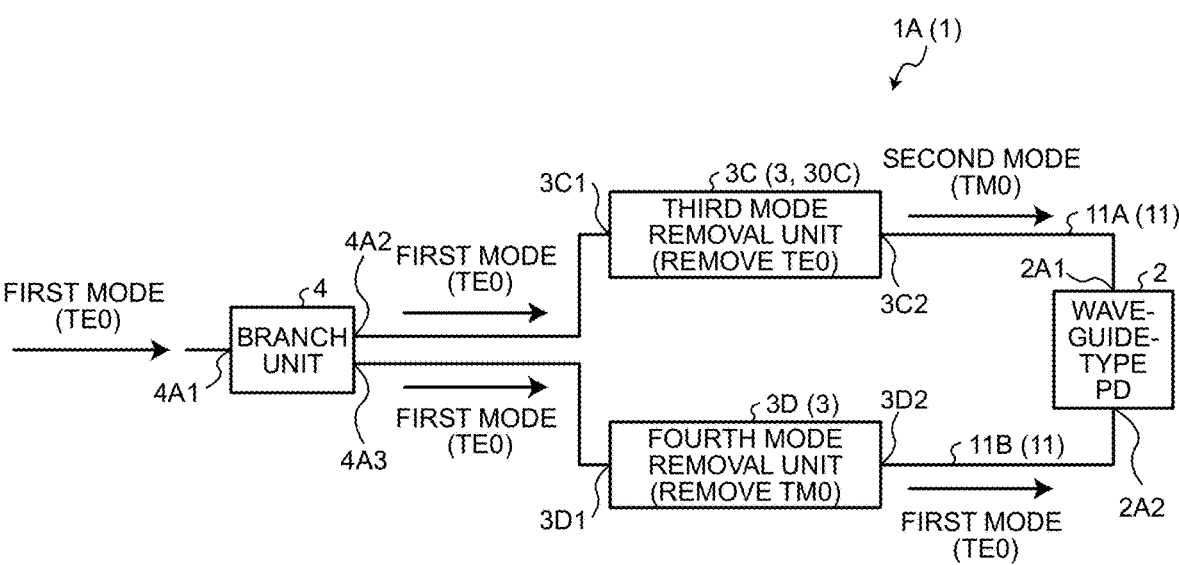
FIG. 4 is a block diagram illustrating an example of an optical detector according to a second embodiment.

FIG. 4 is a block diagram illustrating an example of an optical detector 1A according to a second embodiment. For convenience of explanation, the same configuration as that of the optical detector 1 in the first embodiment is denoted by the same reference numeral, and the description about the duplicated configuration and operation will not be repeated. The optical detector 1A according to the second embodiment illustrated in FIG. 4 includes a branch unit 4, a third mode removal unit 3C, a fourth mode removal unit 3D, and the waveguide-type PD 2. The branch unit 4 includes an input port 4A1, an output port 4A2, and an output port 4A3, and outputs the signal light of the first mode from the input port 4A1 to the output port 4A2 and the output port 4A3 in a branched manner. The signal light of the first mode is assumed to be TE0, and the signal light of the second mode is assumed to be TM0. Herein, each of TE0 and TM0 indicates a waveguide mode the effective refractive index of which is the largest among waveguide modes (TE mode, TM mode) in which a direction of a principal component of an electric field becomes horizontal or vertical to the substrate.

The third mode removal unit 3C includes a third input port 3C1, a third output port 3C2, and a third filter 30C. The third filter 30C converts the signal light of the first mode (signal light of TE0) input from the third input port 3C1 into the signal light of the second mode (signal light of TM0), and removes the signal light of TE0 input from the third output port 3C2.

The fourth mode removal unit 3D includes a fourth input port 3D1, a fourth output port 3D2, and a fourth filter 30D. The fourth filter 30D passes and outputs the signal light of TE0 input from the fourth input port 3D1, and removes the signal light of TM0 input from the fourth output port 3D2.

The absorbing layer 12 converts the signal light of TM0 input from the first port 2A1 into electron-hole pairs, and converts the signal light of TEC input from the second port 2A2 into electron-hole pairs. However, in a case in which part of the signal light of TM0 input from the first port 2A1 is not completely absorbed by the absorbing layer 12 and remains therein, residual signal light of TM0 is output from the second port 2A2. Thus, the fourth filter 30D in the fourth mode removal unit 3D removes the signal light of TM0 input from the fourth output port 3D2.

Additionally, in a case in which part of the signal light of TEC input from the second port 2A2 is not completely absorbed by the absorbing layer 12 and remains therein, residual signal light of TE0 is output from the first port 2A1. Thus, the third filter 30C in the third mode removal unit 3C removes the signal light of TE0 input from the third output port 3C2. As a result, the optical detector 1 can suppress backflow of the residual light in the absorbing layer 12.

That is, the fourth mode removal unit 3D can suppress backflow of the signal light of TM0 to the branch unit 4 by removing the residual signal light of TM0 in the absorbing layer 12. Furthermore, the third mode removal unit 3C can suppress backflow of the signal light of TE0 to the branch unit 4 by removing the residual signal light of TE0 in the absorbing layer 12.

Figure 5:
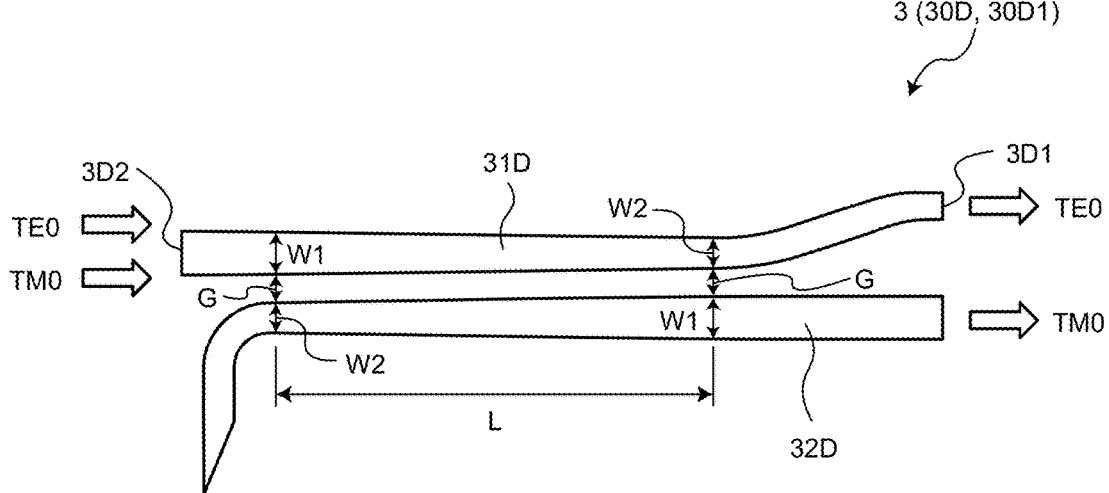
FIG. 5 is an explanatory diagram illustrating an example of a fourth mode removal unit.

FIG. 5 is an explanatory diagram illustrating an example of the fourth mode removal unit 3D. The fourth filter 30D in the fourth mode removal unit 3D is an adiabatic converter 30D1 configured by disposing a first waveguide 31D having a tapered shape and a second waveguide 32D having a tapered shape in parallel with each other. In a parallel section L of the adiabatic converter 30D1 in which the first waveguide 31D is parallel with the second waveguide 32D, there are a start point and an end point. A width W1 of the first waveguide 31D at the start point is equal to the width W1 of the second waveguide 32D at the end point. A width W2 of the first waveguide 31D at the end point is equal to the width W2 of the second waveguide 32D at the start point. Intervals G between the first waveguide 31D and the second waveguide 32D are the same at the start point and the end point.

In a case in which pieces of the signal light of TE0 and TM0 are input from the fourth output port 3D2 of the first waveguide 31D, the adiabatic converter 30D1 passes and outputs the signal light of TE0 from the fourth input port 3D1 of the first waveguide 31D. The adiabatic converter 30D1 causes the signal light of TM0 to gradually transition from the first waveguide 31D to the second waveguide 32D, and separately outputs the signal light of TM0 from the second waveguide 32D. The fourth mode removal unit 3D has reversibility, so that, in a case in which the signal light of TE0 is input from the fourth input port 3D1 of the first waveguide 31D, the fourth mode removal unit 3D passes and outputs the signal light of TE0 from the fourth output port 3D2 of the first waveguide 31D.

Figure 6:
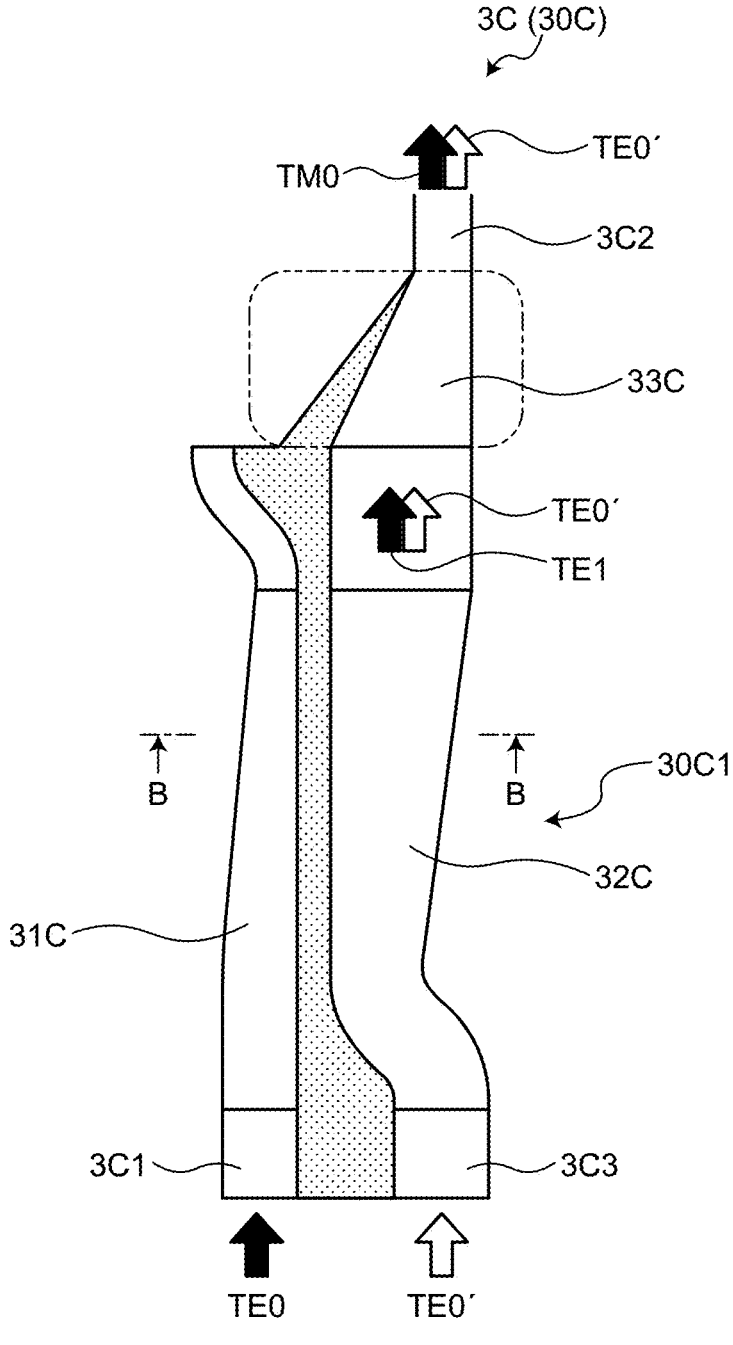
FIG. 6 is an explanatory diagram illustrating an example of a third mode removal unit.
Figure 7:
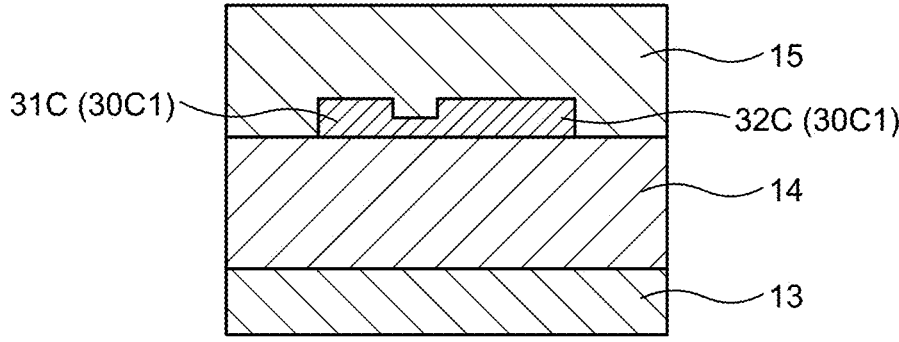
FIG. 7 is a schematic cross-sectional view along a line B-B illustrated in FIG. 6.

FIG. 6 is an explanatory diagram illustrating an example of the third mode removal unit 3C, and FIG. 7 is a schematic cross-sectional view along a line B-B illustrated in FIG. 6. The third filter 30C in the third mode removal unit 3C illustrated in FIG. 6 and FIG. 7 includes an adiabatic converter 30C1 and a tapered waveguide 33C. The third mode removal unit 3C includes the Si substrate 13, the BOX layer 14 laminated on the Si substrate 13, the adiabatic converter 30C1 and the tapered waveguide 33C laminated on the BOX layer 14, and the buffer layer 15 covering the BOX layer 14, the adiabatic converter 30C1, and the tapered waveguide 33C. The adiabatic converter 30C1 can couple the signal light of TE0 with signal light of TE1. The tapered waveguide 33C is a waveguide that adiabatically converts the signal light of TE1 into the signal light of TM0.

The third mode removal unit 3C converts the signal light of TE0 and the signal light of TM0 using the adiabatic converter 30C1 and the tapered waveguide 33C, and the input signal light of TM0 and signal light of TE0 can be spatially separated from each other. In the adiabatic converter 30C1, a first waveguide 31C and a second waveguide 32C are disposed in parallel with each other, the third input port 3C1 is caused to be an input port of the first waveguide 31C, and an input port of the second waveguide 32C is caused to be a discard port 3C3. In the adiabatic converter 30C1, when the signal light of TE0 is input to the third input port 3C1, the signal light of TE0 transitions from the first waveguide 31C to the second waveguide 32C to convert the signal light of TE0 into the signal light of TE1. Furthermore, the tapered waveguide 33C converts the signal light of TE1 into the signal light of TM0 to be output from the third output port 3C2. The third mode removal unit 3C has reversibility, so that, when signal light of TE0' is input from the third output port 3C2 of the tapered waveguide 33C, the third mode removal unit 3C passes and outputs the signal light of TE0' to the discard port 3C3 to remove the signal light of TE0'. The signal light of TE0' is signal light of TE0 input from the third output port 3C2.

The following describes a result of comparison between the optical detector 1A according to the second embodiment and a comparative example. In the comparative example, the branch unit 4 is directly connected to the waveguide-type PD 2 without the third mode removal unit 3C and the fourth mode removal unit 3D. In the comparative example, the output port 4A2 of the branch unit 4 is connected to the first port 2A1 of the waveguide-type PD 2 by the first input waveguide 11A to input the signal light of TE0 to the first port 2A1, and the output port 4A3 of the branch unit 4 is connected to the second port 2A2 by the second input waveguide 11B to input the signal light of TE0 to the second port 2A2. Regarding the waveguide-type PD 2 in FIG. 2A, FIG. 2B, and FIG. 3, transmittance for TE0 of the absorbing layer 12 in a case of inputting the signal light of TE0 to the first input waveguide 11A and inputting the signal light of TM0 to the second input waveguide 11B was calculated by using the Finite-Difference Time-Domain method. As parameters of the waveguide-type PD 2, the thickness of the waveguide layer 11 is assumed to be, for example, 0.22 μm, the width of the undoped region 11C3 is assumed to be, for example, 0.4 μm, and the thickness of the absorbing layer 12 is assumed to be, for example, 0.3 μm. The width of the absorbing layer 12 is assumed to be, for example, 1.0 μm, and the length of the absorbing layer 12 is assumed to be, for example, 40 μm. A wavelength was assumed to be 1.52 μm, a material refractive index of Ge used for the absorbing layer 12 was assumed to be 4.278+i0.0245, a material refractive index of Si used for the Si substrate 13 was assumed to be 3.45, and a material refractive index of SiO$_2$ used for the BOX layer 14 and the buffer layer 15 was assumed to be 1.44.

Regarding the optical detector according to the comparative example, calculated was a ratio of the signal light of TE0 output from the first input waveguide 11A in a case of inputting the signal light of TE0 to the second input waveguide 11B. As a result, an output ratio was −24.15 dB. However, in the waveguide-type PD 2, optical power that has passed through the absorbing layer 12 and flowed backward is multiplexed at the branch unit 4, so that the ratio of output from the branch unit 4 is −24.15 dB at the maximum with respect to input power to the branch unit 4. A cross-sectional structure of the waveguide-type PD 2 is not limited to that in FIG. 3. In a configuration of including a plurality of ports, light that is not absorbed by the absorbing layer is output from another port with any cross-sectional structure. Thus, passed light caused by backflow of residual light may be generated even if any cross-sectional structure is employed.

In a case in which the optical detector 1A according to the second embodiment is used, the signal light of the first mode is assumed to be TE0, the signal light of the second mode is assumed to be TM0, and pieces of the signal light of TE0 and TM0 are input to the absorbing layer 12, mode conversion may be caused in the waveguide-type PD 2. In this case, an effect of disposing the third mode removal unit 3C and the fourth mode removal unit 3D may be lost.

In the optical detector 1A, in a case of inputting the signal light of TE0 to the second input waveguide 11B, a ratio of the signal light of TE0 output from the first input waveguide 11A is −24.15 dB. Furthermore, a ratio of the signal light of TM0 output from the first input waveguide 11A, that is, a ratio of mode conversion, is −78.61 dB. In a case of inputting the signal light of TM0 to the first input waveguide 11A, a ratio of the signal light of TM0 output from the second input waveguide 11B is −34.62 dB. Furthermore, a ratio of the signal light of TE0 output from the second input waveguide 11B, that is, a ratio of mode conversion, is −73.82 dB.

As a result, naturally, regarding outputs to the same mode, passed light caused by backflow of unnecessary residual light can be removed by using the third mode removal unit 3C and the fourth mode removal unit 3D. Furthermore, mode conversion in the waveguide-type PD 2 is negligible, so that unnecessary passed light can be removed by adding a mode removable structure. In a waveguide structure that is symmetrical within an optional plane along a traveling direction of light, conversion between different polarized waves becomes very small, so that different polarized waves are preferably used in such a waveguide structure.

The optical detector 1A according to the second embodiment includes the third mode removal unit 3C and the fourth mode removal unit 3D. The fourth mode removal unit 3D passes the signal light of TE0 from the branch unit 4, and removes the signal light of TM0 from the second port 2A2. The third mode removal unit 3C converts the signal light of TE0 from the branch unit 4 into the signal light of TM0, passes the signal light of TM0 after the conversion, and removes the signal light of TE0 from the first port 2A1. As a result, the optical detector 1A can suppress backflow of the residual light in the absorbing layer 12.

The fourth mode removal unit 3D includes the adiabatic converter 30D1 that passes the signal light of TE0 from the branch unit 4 and removes the signal light of TM0 from the second port 2A2. The third mode removal unit 3C includes the adiabatic converter 30C1 that converts the signal light of TE0 from the branch unit 4 into the signal light of TM0, and the tapered waveguide 33C that passes the signal light of TM0 after being converted by the adiabatic converter 30C1 and removes the signal light of TE0 from the first port 2A1. As a result, the optical detector 1A can suppress backflow of the residual light in the absorbing layer 12.

For convenience of explanation, exemplified is a case in which the optical detector 1A according to the second embodiment uses the signal light of TE0 as the signal light of the first mode and uses the signal light of TM0 as the signal light of the second mode, but the embodiment is not limited thereto and can be appropriately changed. The following describes an optical detector 1B according to a third embodiment using the signal light of the first mode as the signal light of TE0, and using the signal light of the second mode as the signal light of TE1.

(c) Third Embodiment

Figure 8:
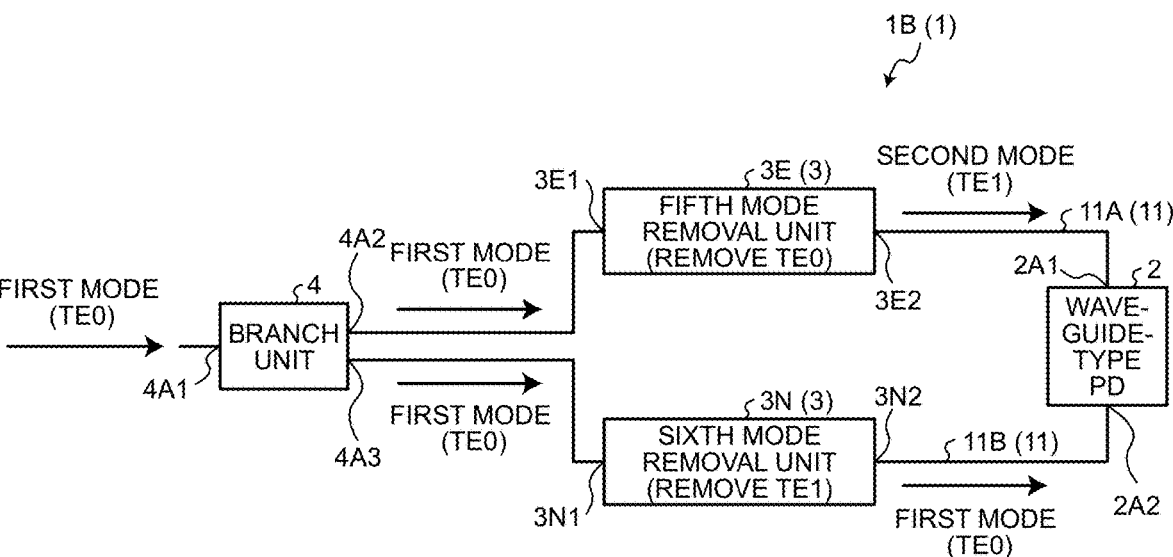
FIG. 8 is a block diagram illustrating an example of an optical detector according to a third embodiment.

FIG. 8 is a block diagram illustrating an example of the optical detector 1B according to the third embodiment. For convenience of explanation, the same configuration as that of the optical detector 1A in the second embodiment is denoted by the same reference numeral, and the description about the duplicated configuration and operation will not be repeated. The optical detector 1B illustrated in FIG. 8 is different from the optical detector 1A illustrated in FIG. 4 in that a fifth mode removal unit 3E is disposed in place of the third mode removal unit 3C, and a sixth mode removal unit 3N is disposed in place of the fourth mode removal unit 3D. The fifth mode removal unit 3E uses an adiabatic converter 30E with which the signal light of TE0 can be coupled with the signal light of TE1.

Figure 9A:
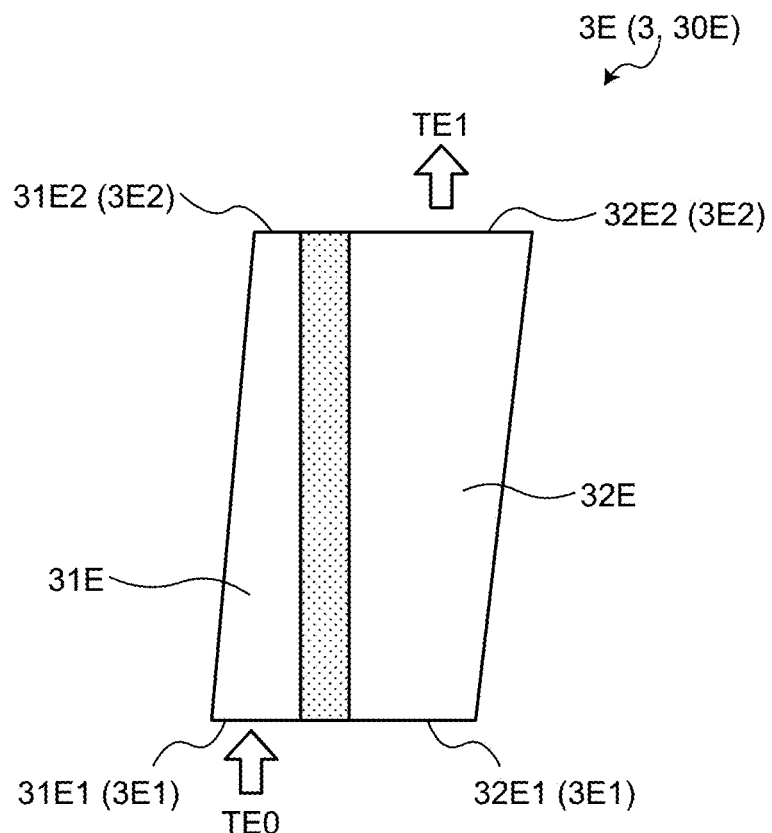
FIG. 9A is an explanatory diagram illustrating an example of a fifth mode removal unit.

FIG. 9A is an explanatory diagram illustrating an example of the fifth mode removal unit 3E. The fifth mode removal unit 3E illustrated in FIG. 9A is the adiabatic converter 30E. In the adiabatic converter 30E, a first waveguide 31E and a second waveguide 32E are disposed in parallel with each other. The adiabatic converter 30E includes an input port 31E1 (3E1) and an output port 31E2 (3E2) of the first waveguide 31E, and an input port 32E1 (3E1) and an output port 32E2 (3E2) of the second waveguide 32E. The first waveguide 31E has a structure in which a waveguide width is gradually reduced from the input port 31E1 toward the output port 31E2. The second waveguide 32E has a structure in which a waveguide width is gradually reduced from the output port 32E2 toward the input port 32E1.

In a case of inputting the signal light of TE0 from the input port 31E1 of the first waveguide 31E, the adiabatic converter 30E causes the signal light of TE0 to gradually and adiabatically transition to the signal light of TE1 from the first waveguide 31E toward an output side of the second waveguide 32E. The adiabatic converter 30E then outputs the signal light of TE1 from the output port 32E2 of the second waveguide 32E. In a case of inputting the signal light of TE0 from the input port 32E1 of the second waveguide 32E, the adiabatic converter 30E passes and outputs the signal light of TE0 from the output port 32E2 of the second waveguide 32E.

Considering reversibility of the adiabatic converter 30E of the fifth mode removal unit 3E, the signal light of TE1 input from the output port 32E2 of the second waveguide 32E is converted into the signal light of TE0 to be output from the input port 31E1 of the first waveguide 31E. The signal light of TE0 input from the output port 32E2 of the second waveguide 32E is directly output from the input port 32E1 of the second waveguide 32E to remove the signal light of TE0.

The adiabatic converter 30E functions as a mode conversion removal unit by connecting the input port 32E1 (3E1) of the first waveguide 31E to the branch unit 4 and connecting the output port 32E2 (3E2) of the second waveguide 32E to the first port 2A1 of the waveguide-type PD 2. In this case, the signal light of TE0 input to the output port 32E2 (3E2) of the second waveguide 32E, that is, the signal light of TE0 passed through the waveguide-type PD 2, is output from the input port 32E1 (3E1) of the second waveguide 32E. Thus, to remove this unnecessary light, the input port 32E1 (3E1) of the second waveguide 32E is caused to be an optical termination. In a case of causing the input port 32E1 of the second waveguide 32E to be the optical termination, for example, the input port 32E1 may be caused to have a tapered structure that is tapering off, or may be connected to a doped waveguide. As the optical termination, a monitor PD for monitoring unnecessary light may be connected, and the embodiment can be appropriately changed.

Figure 9B:
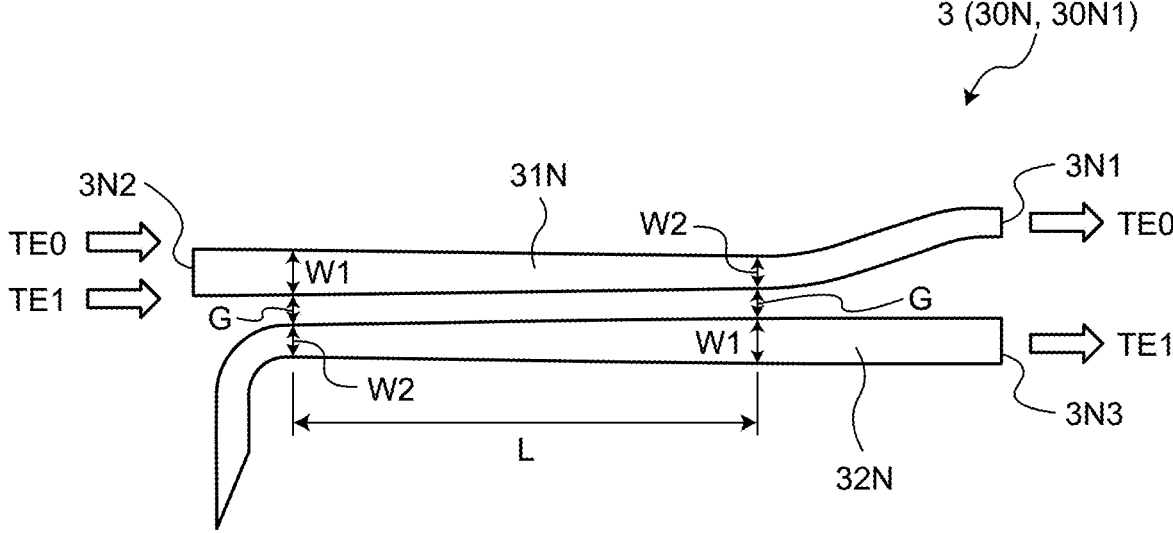
FIG. 9B is an explanatory diagram illustrating an example of a sixth mode removal unit.

FIG. 9B is an explanatory diagram illustrating an example of the sixth mode removal unit 3N. A sixth filter 30N in the sixth mode removal unit 3N is an adiabatic converter 30N1 configured by disposing a first waveguide 31N having a tapered shape and a second waveguide 32N having a tapered shape in parallel with each other. In the parallel section L of the adiabatic converter 30N1 in which the first waveguide 31N is parallel with the second waveguide 32N, there are a start point and an end point. The width W1 of the first waveguide 31N at the start point is equal to the width W1 of the second waveguide 32N at the end point. The width W2 of the first waveguide 31N at the end point is equal to the width W2 of the second waveguide 32N at the start point.

The intervals G between the first waveguide 31N and the second waveguide 32N are the same at the start point and the end point.

In a case in which pieces of the signal light of TE0 and TE1 are input from a sixth output port 3N2 of the first waveguide 31N, the adiabatic converter 30N1 passes and outputs the signal light of TE0 from a sixth input port 3N1 of the first waveguide 31N. The adiabatic converter 30N1 causes the signal light of TE1 to gradually transition from the first waveguide 31N to the second waveguide 32N, and separately outputs the signal light of TE1 from the second waveguide 32N. The sixth mode removal unit 3N has reversibility, so that, in a case in which the signal light of TE0 is input from the sixth input port 3N1 of the first waveguide 31N, the sixth mode removal unit 3N passes and outputs the signal light of TE0 from the sixth output port 3N2 of the first waveguide 31N.

In the adiabatic converter 30N1 in the sixth mode removal unit 3N, the sixth input port 3N1 of the first waveguide 31N is connected to the branch unit 4, and the sixth output port 3N2 of the first waveguide 31N is connected to the waveguide-type PD 2. In this case, the signal light of TE1 that has been input to the sixth output port 3N2 of the first waveguide 31N and passed through the waveguide-type PD 2 reaches an input port 3N3 of the second waveguide 32N as the optical termination. In a case of causing the input port 3N3 of the second waveguide 32N to be the optical termination, for example, the input port 3N3 may be caused to have a tapered structure that is tapering off, or may be connected to a doped waveguide and the like. As the optical termination, a monitor PD for monitoring unnecessary light may be connected, and the embodiment can be appropriately changed.

In a case in which the optical detector 1B according to the third embodiment is used, the signal light of the first mode is assumed to be TE0, the signal light of the second mode is assumed to be TE1, and pieces of the signal light of TE0 and TE1 are input to the absorbing layer 12, mode conversion may be caused in the waveguide-type PD 2. In this case, an effect of disposing the fifth mode removal unit 3E and the sixth mode removal unit 3N may be lost. Thus, regarding the waveguide-type PD 2 in FIG. 3, transmittance of the absorbing layer 12 in a case of inputting the signal light of TE0 to the first input waveguide 11A and inputting the signal light of TE1 to the second input waveguide 11B was calculated by using the Finite-Difference Time-Domain method.

In a case of inputting the signal light of TE0 to the second input waveguide 11B, a ratio of the signal light of TE0 output from the first input waveguide 11A is −24.15 dB. Furthermore, a ratio of the signal light of TE1 output from the first input waveguide 11A, that is, a ratio of mode conversion, is −65.27 dB. In a case of inputting the signal light of TE1 to the first input waveguide 11A, a ratio of the signal light of TE1 output from the second input waveguide 11B is −23.36 dB. Furthermore, a ratio of the signal light of TE0 output from the second input waveguide 11B, that is, a ratio of mode conversion, is −63.68 dB.

As a result, naturally, regarding outputs to the same mode, passed light caused by backflow of unnecessary residual light can be removed by using the fifth mode removal unit 3E and the sixth mode removal unit 3N. Furthermore, mode conversion in the waveguide-type PD 2 is negligible, so that unnecessary passed light can be removed by adding a mode removable structure. In a waveguide structure that is symmetrical within an optional plane along the traveling direction of light, conversion between an even-order mode and an odd-order mode with the same polarized wave becomes very small, so that it is preferable to use these related modes especially in such a waveguide structure.

The optical detector 1B according to the third embodiment includes the fifth mode removal unit 3E and the sixth mode removal unit 3N. The sixth mode removal unit 3N passes the signal light of TE0 from the branch unit 4, and removes the signal light of TE1 from the second port 2A2. The fifth mode removal unit 3E converts the signal light of TE0 from the branch unit 4 into the signal light of TE1, passes the signal light of TE1 after the conversion, and removes the signal light of TE0 from the first port 2A1. As a result, the optical detector 1B can suppress backflow of the residual light in the absorbing layer 12.

The sixth filter 30N in the sixth mode removal unit 3N includes the adiabatic converter 30N1 that passes the signal light of TE0 from the branch unit 4 and removes the signal light of TE1 from the second port 2A2. The adiabatic converter 30E in the fifth mode removal unit 3E converts the signal light of TE0 from the branch unit 4 into the signal light of TE1 to be output, and removes the signal light of TE0 from the first port 2A1. As a result, it is possible to suppress backflow of the residual light in the absorbing layer 12.

For convenience of explanation, the structure illustrated in FIG. 6 is exemplified for the third mode removal unit 3C, the structure illustrated in FIG. 5 is exemplified for the fourth mode removal unit 3D, the structure illustrated in FIG. 9A is exemplified for the fifth mode removal unit 3E, and the structure illustrated in FIG. 9B is exemplified for the sixth mode removal unit 3N. However, the structures are not limited thereto, and can be appropriately changed.

Regarding the optical detector 1A according to the second embodiment, exemplified is a case of disposing the third mode removal unit 3C and the fourth mode removal unit 3D, but the embodiment is not limited thereto and can be appropriately changed. Thus, the following describes an embodiment thereof as an optical detector 1C according to a fourth embodiment.

(d) Fourth Embodiment

Figure 10:
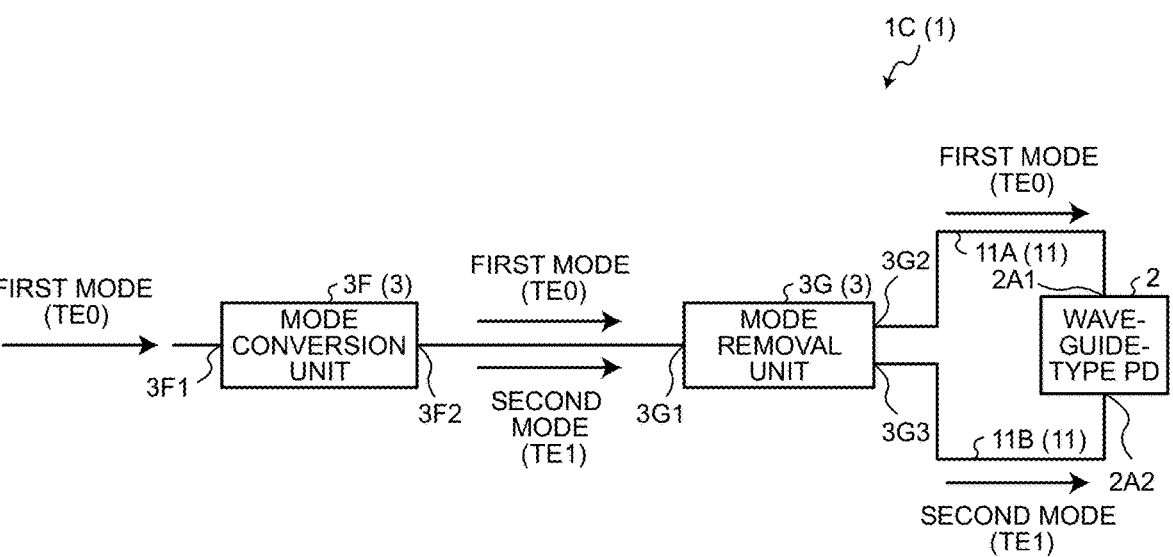
FIG. 10 is a block diagram illustrating an example of an optical detector according to a fourth embodiment.

FIG. 10 is a block diagram illustrating an example of the optical detector 1C according to the fourth embodiment. The same configuration as that of the optical detector 1 in the first embodiment is denoted by the same reference numeral, and the description about the duplicated configuration and operation will not be repeated. The optical detector 1C illustrated in FIG. 10 includes a mode conversion unit 3F, a mode removal unit 3G, and the waveguide-type PD 2. The mode conversion unit 3F includes an input port 3F1, an output port 3F2, and a conversion unit 30F. When the signal light of TE0 is input from the input port 3F1, the conversion unit 30F converts the signal light of TE0 into pieces of the signal light of TE0 and TE1. That is, when the signal light of TE0 is input from the input port 3F1, the conversion unit 30F converts the signal light of TE0 into signal light in which TE0 and TE1 are mixed. The mode removal unit 3G includes an input port 3G1, a first output port 3G2, a second output port 3G3, and a filter 30G.

The input port 3G1 is connected to the output port 3F2 of the mode conversion unit 3F. The first output port 3G2 is connected to the first input waveguide 11A of the waveguide-type PD 2. The second output port 3G3 is connected to the second input waveguide 11B of the waveguide-type PD 2. The filter 30G passes and outputs the signal light of TE0 from the input port 3G1 to the first output port 3G2, and removes the signal light of TE1 flowing backward from the first output port 3G2. The filter 30G passes and outputs the signal light of TE1 from the input port 3G1 to the second output port 3G3, and removes the signal light of TE0 flowing backward from the second output port 3G3.

The absorbing layer 12 in the waveguide-type PD 2 receives the signal light of TE0 input from the first input waveguide 11A and converts the signal light of TE0 into electron-hole pairs, and receives the signal light of TE1 input from the second input waveguide 11B and converts the signal light of TE1 into electron-hole pairs.

In a case in which part of the signal light of TE0 from the first input waveguide 11A remains, the absorbing layer 12 outputs the residual signal light of TE0 to the second input waveguide 11B. The filter 30G in the mode removal unit 3G removes the signal light of TE0 input from the second input waveguide 11B. In a case in which part of the signal light of TE1 from the second input waveguide 11B remains, the absorbing layer 12 outputs the residual signal light of TE1 to the first input waveguide 11A. The filter 30G in the mode removal unit 3G removes the signal light of TE1 input from the first input waveguide 11A.

Figure 11:
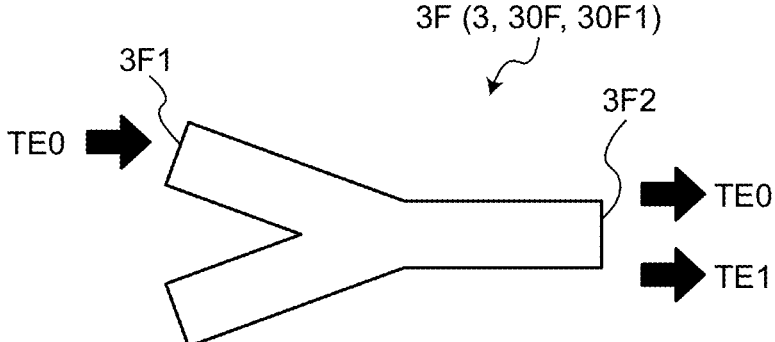
FIG. 11 is an explanatory diagram illustrating an example of a mode conversion unit.

FIG. 11 is an explanatory diagram illustrating an example of the mode conversion unit 3F. The conversion unit 30F in the mode conversion unit 3F illustrated in FIG. 11 is, for example, configured by a Y-branch waveguide 30F1. In a case of inputting the signal light of TE0, the Y-branch waveguide 30F1 outputs pieces of the signal light of TE0 and TE1.

Figure 12A:
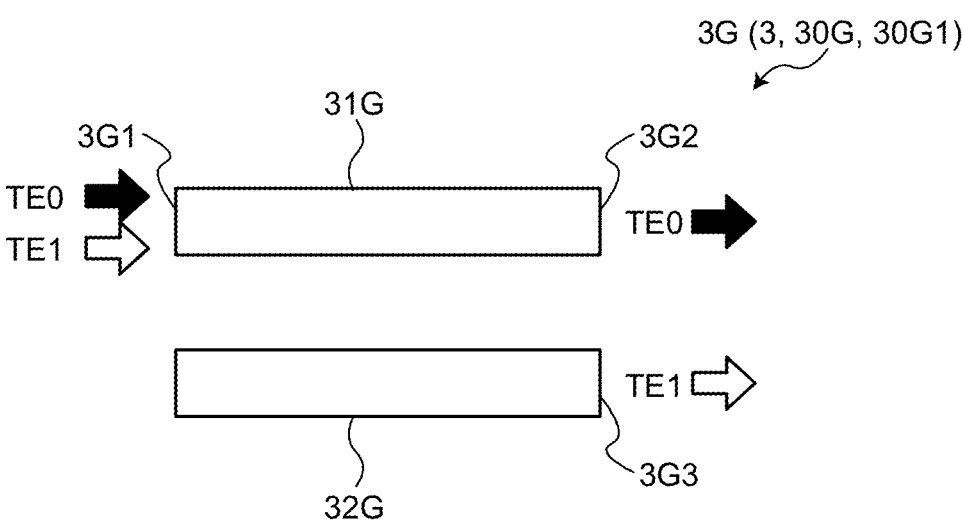
FIG. 12A is an explanatory diagram illustrating an example of an operation of a mode removal unit at the time of input.
Figure 12B:
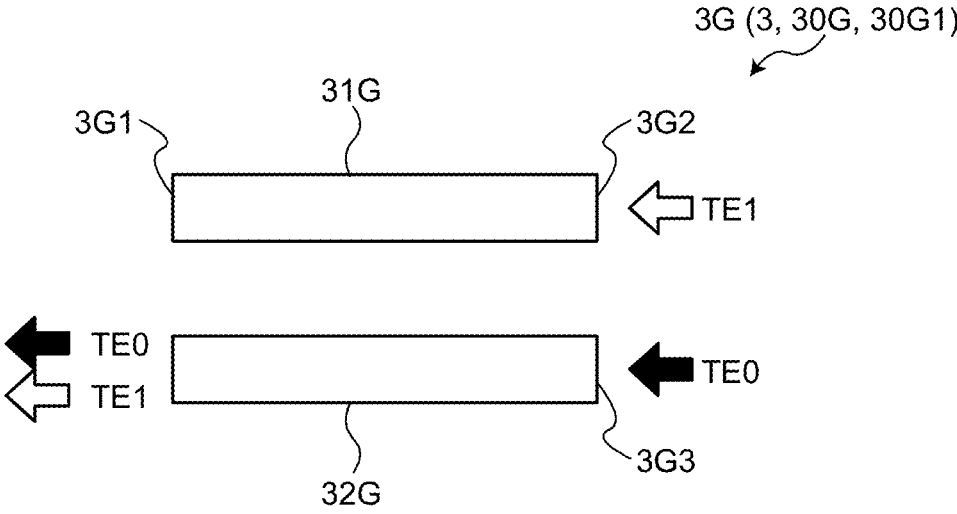
FIG. 12B is an explanatory diagram illustrating an example of an operation of the mode removal unit at the time of backflow.

FIG. 12A is an explanatory diagram illustrating an example of an operation of the mode removal unit 3G at the time of input, and FIG. 12B is an explanatory diagram illustrating an example of an operation of the mode removal unit 3G at the time of backflow. The mode removal unit 3G illustrated in FIG. 12A is, for example, configured by a directional coupler 30G1. In the directional coupler 30G1, a first waveguide 31G having a linear shape and a second waveguide 32G having a linear shape are disposed in parallel with each other. In a case in which pieces of the signal light of TE0 and TE1 are input from the first waveguide 31G, the directional coupler 30G1 outputs the signal light of TE0 from the first output port 3G2 of the first waveguide 31G to the first input waveguide 11A. Furthermore, the directional coupler 30G1 outputs the signal light of TE1 from the second output port 3G3 of the second waveguide 32G to the second input waveguide 11B.

In the directional coupler 30G1 illustrated in FIG. 12B, the signal light of TE1 is input from the first output port 3G2 of the first waveguide 31G, and the signal light of TE0 is input from the second output port 3G3 of the second waveguide 32G. In this case, the directional coupler 30G1 outputs the signal light of TE1 and the signal light of TE0 to an optical termination connected to the input port of the second waveguide 32G. As a result, it is possible to remove the signal light of TE1 and the signal light of TE0 flowing backward from the waveguide-type PD 2.

The optical detector 1C according to the fourth embodiment includes the mode conversion unit 3F and the mode removal unit 3G. The mode conversion unit 3F converts the signal light of TE0 into the signal light of TE0 and the signal light of TE1 to be output to the mode removal unit 3G. The mode removal unit 3G passes the signal light of TE0 from the mode conversion unit 3F, and removes the signal light of TE1 from the first port 2A1 of the waveguide-type PD 2. The mode removal unit 3G passes the signal light of TE1 from the mode conversion unit 3F, and removes the signal light of TE0 from the second port 2A2 of the waveguide-type PD 2.

As a result, the optical detector 1C can remove the signal light of TE1 and the signal light of TE0 flowing backward from the absorbing layer 12.

The mode conversion unit 3F includes the Y-branch waveguide 30F1 that outputs the signal light of TE0 as the signal light of TE0 and the signal light of TE1. The mode removal unit 3G includes the directional coupler 30G1 that passes the signal light of TE0 from the Y-branch waveguide 30F1 and removes the signal light of TE1 from the first port 2A1. Furthermore, the directional coupler 30G1 passes the signal light of TE1 from the Y-branch waveguide 30F1 and removes the signal light of TE0 from the second port 2A2. As a result, the optical detector 1C can remove the signal light of TE1 and the signal light of TE0 flowing backward from the absorbing layer 12.

Regarding the optical detector 1C according to the fourth embodiment, exemplified is a case of inputting pieces of the signal light of TE0 and TE1 to the waveguide-type PD 2, but the embodiment is not limited thereto and can be appropriately changed. For example, pieces of the signal light of TE0 and TM0 may be input to the waveguide-type PD 2, and an embodiment thereof will be described below as an optical detector 1D according to a fifth embodiment.

(e) Fifth Embodiment

Figure 13:
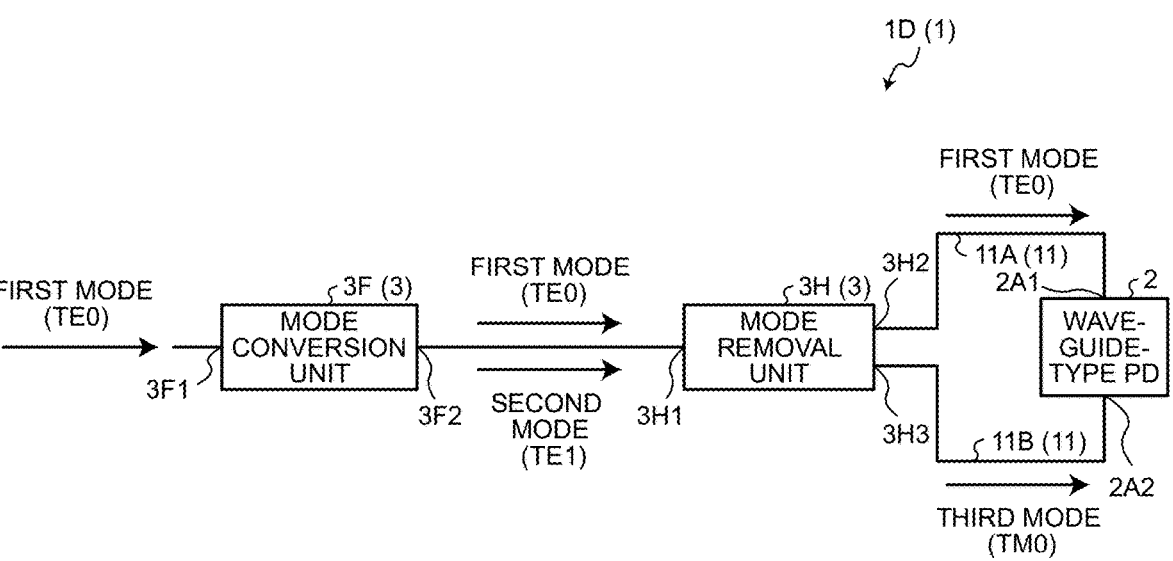
FIG. 13 is a block diagram illustrating an example of an optical detector according to a fifth embodiment.

FIG. 13 is a block diagram illustrating an example of the optical detector 1D according to the fifth embodiment. The same configuration as that of the optical detector 1C in the fourth embodiment is denoted by the same reference numeral, and the description about the duplicated configuration and operation will not be repeated. The optical detector 1D according to the fifth embodiment includes the mode conversion unit 3F, a mode removal unit 3H, and the waveguide-type PD 2. The mode conversion unit 3F includes an input port 3F1, an output port 3F2, and a conversion unit 30F. When the signal light of TE0 is input from the input port 3F1, the conversion unit 30F converts the signal light of TE0 into pieces of the signal light of TE0 and TE1. That is, when the signal light of TE0 is input from the input port 3F1, the conversion unit 30F converts the signal light of TE0 into signal light in which TE0 and TE1 are mixed. The mode removal unit 3H includes an input port 3H1, a first output port 3H2, a second output port 3H3, and a filter 30H.

The input port 3H1 is connected to the output port 3F2 of the mode conversion unit 3F. The first output port 3H2 is connected to the first input waveguide 11A of the waveguide-type PD 2. The second output port 3H3 is connected to the second input waveguide 11B of the waveguide-type PD 2. The filter 30H converts the signal light of TE1 from the input port 3H1 into the signal light of TM0 to be output to the second output port 3H3, and removes the signal light of TE0 flowing backward from the second port 2A2. The filter 30H passes and outputs the signal light of TE0 from the input port 3H1 to the second output port 3H3, and removes the signal light of TM0 flowing backward from the first port 2A1.

Figure 14:
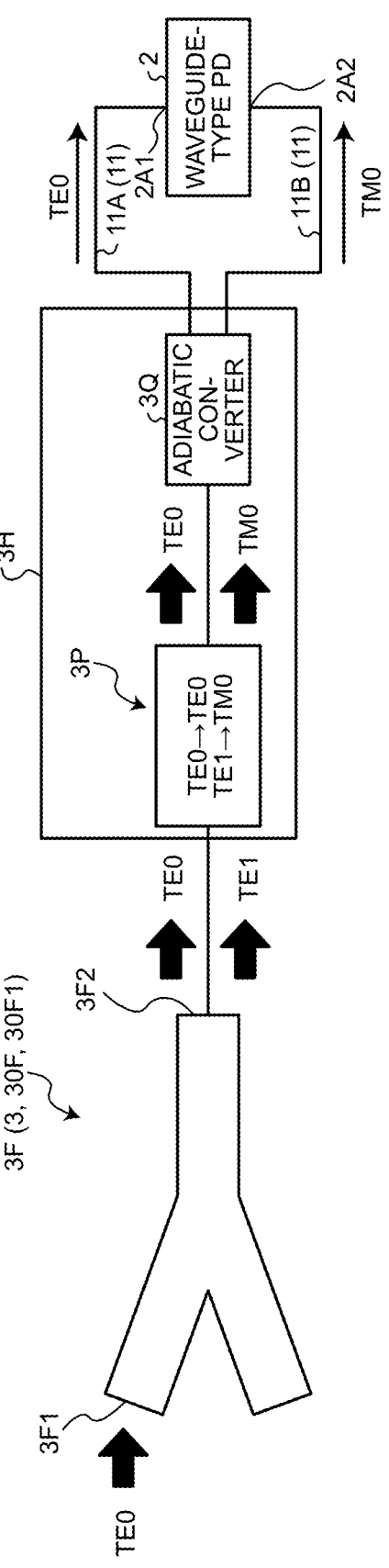
FIG. 14 is an explanatory diagram illustrating an example of transition of light in the optical detector according to the fifth embodiment.

FIG. 14 is an explanatory diagram illustrating an example of transition of light in the optical detector 1D according to the fifth embodiment. The conversion unit 30F illustrated in FIG. 14 is, for example, configured by the Y-branch waveguide 30F1. The Y-branch waveguide 30F1 converts the signal light of TE0 input from the input port 3F1 into pieces of the signal light of TE0 and TE1, and outputs the pieces of signal light of TE0 and TE1 after the conversion from the output port 3F2 to the mode removal unit 3H.

Figure 15:
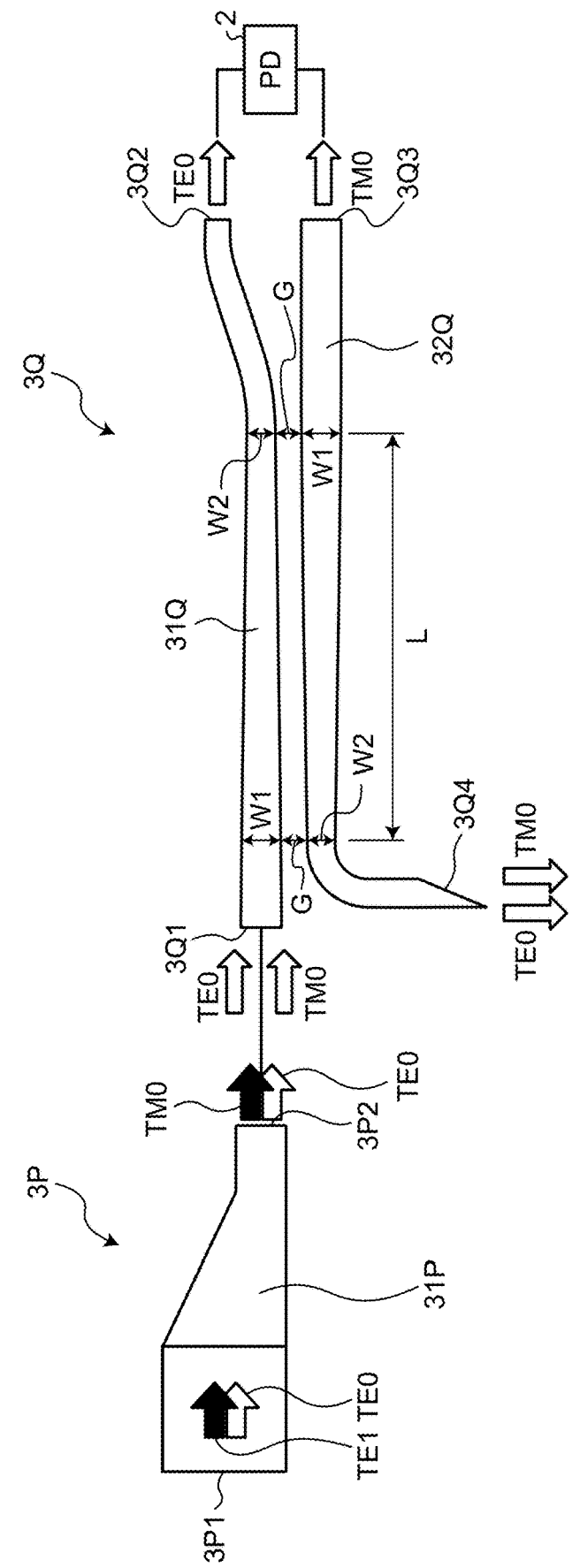
FIG. 15 is an explanatory diagram illustrating an example of the mode removable unit.

FIG. 15 is an explanatory diagram illustrating an example of the mode removal unit 3H. The mode removal unit 3H illustrated in FIG. 15 includes a conversion unit 3P and an adiabatic converter 3Q. The conversion unit 3P includes an input port 3P1, an output port 3P2, and a tapered waveguide 31P. The input port 3P1 is connected to an input stage of the tapered waveguide 31P, and caused to be the input port 3H1 of the mode removal unit 3H. The output port 3P2 is a port that is connected to an output stage of the tapered waveguide 31P, and connected to the adiabatic converter 3Q.

The tapered waveguide 31P is a tapered waveguide in which magnitude of effective refractive indexes of the signal light of TE1 and the signal light of TM0 is reversed between an input cross section and an output cross section, and a cross section of a material refractive index becomes vertically asymmetrical. In the tapered waveguide 31P, a portion the height of which is lower than a core (slab part) is disposed to achieve vertically asymmetrical shape, but the waveguide structure can be efficiently changed by separately adding a structure that generates a slab part having a tapered shape as the above portion.

The tapered waveguide 31P converts the signal light of TE1 input from the input port 3P1 into the signal light of TM0, and outputs the signal light of TM0 after the conversion from the output port 3P2. The tapered waveguide 31P passes the signal light of TE0 input from the input port 3P1, and outputs the signal light of TE0 after the transmission from the output port 3P2. The tapered waveguide 31P converts the signal light of TM0 input from the output port 3P2 into the signal light of TE1, and outputs the signal light of TE1 after the conversion from the input port 3P1. The tapered waveguide 31P passes the signal light of TE0 input from the output port 3P2, and outputs the signal light of TE0 after the transmission from the input port 3P1.

The adiabatic converter 3Q is an adiabatic converter configured by disposing a first waveguide 31Q having a tapered shape and a second waveguide 32Q having a tapered shape in parallel with each other. In the parallel section L of the adiabatic converter 3Q in which the first waveguide 31Q is parallel with the second waveguide 32Q, there are a start point and an end point. The width W1 of the first waveguide 31Q at the start point is equal to the width W1 of the second waveguide 32Q at the end point. The width W2 of the first waveguide 31Q at the end point is equal to the width W2 of the second waveguide 32Q at the start point. The intervals G between the first waveguide 31Q and the second waveguide 32Q are the same at the start point and the end point.

In a case in which pieces of the signal light of TE0 and TM0 are input from an first input port 3Q1 of the first waveguide 31Q, the adiabatic converter 3Q passes and outputs the signal light of TE0 from an first output port 3Q2 of the first waveguide 31Q. The adiabatic converter 3Q causes the signal light of TM0 to gradually transition from the first waveguide 31Q to the second waveguide 32Q, and separately outputs the signal light of TM0 from the second output port 3Q3 of the second waveguide 32Q.

The adiabatic converter 3Q has reversibility, so that, in a case in which the signal light of TM0 is input from the first output port 3Q2 of the first waveguide 31Q, the adiabatic converter 3Q causes the signal light of TM0 to gradually transition from the first waveguide 31Q to the second waveguide 32Q, and outputs the signal light of TM0 from the second input port 3Q4 of the second waveguide 32Q. That is, the adiabatic converter 3Q inputs the signal light of TM0 flowing backward from the waveguide-type PD 2 through the first output port 3Q2 of the first waveguide 31Q. The adiabatic converter 3Q then causes the signal light of TM0 to gradually transition from the first waveguide 31Q to the second waveguide 32Q, and outputs the signal light of TM0 from the second input port 3Q4 of the second waveguide 32Q. As a result, it is possible to remove the signal light of TM0 flowing backward from the waveguide-type PD 2.

In a case of inputting the signal light of TE0 from the second output port 3Q3 of the second waveguide 32Q, the adiabatic converter 3Q passes and outputs the signal light of TE0 from the second input port 3Q4 of the second waveguide 32Q. That is, the adiabatic converter 3Q inputs the signal light of TE0 flowing backward from the waveguide-type PD 2 through the second output port 3Q3 of the second waveguide 32Q. The adiabatic converter 3Q then outputs the signal light of TE0 from the second input port 3Q4 of the second waveguide 32Q. As a result, it is possible to remove the signal light of TE0 flowing backward from the waveguide-type PD 2.

The optical detector 1D according to the fifth embodiment includes the mode conversion unit 3F and the mode removal unit 3H. The mode conversion unit 3F converts the signal light of TE0 into the signal light of TE0 and the signal light of TE1 to be output to the mode removal unit 3H. The mode removal unit 3H passes the signal light of TE0 from the mode conversion unit 3F, and removes the signal light of TM0 from the first port 2A1. The mode removal unit 3H converts the signal light of TE1 from the mode conversion unit 3F into the signal light of TM0, and removes the signal light of TE0 from the second port 2A2. As a result, the optical detector 1D can remove the signal light of TE1 and the signal light of TE0 flowing backward from the waveguide-type PD 2.

The mode conversion unit 3F includes the Y-branch waveguide 30F1 that converts the signal light of TE0 into the signal light of TE0 and the signal light of TE1 to be output to the mode removal unit 3H. The mode removal unit 3H includes the conversion unit 3P and the adiabatic converter 3Q. The tapered waveguide 31P in the conversion unit 3P passes the signal light of TE0 from the Y-branch waveguide 30F1, and converts the signal light of TE1 from the Y-branch waveguide 30F1 into the signal light of TM0. The adiabatic converter 3Q passes the signal light of TM0 from the conversion unit 3P and removes the signal light of TE0 from the second port 2A2, and passes the signal light of TE0 from the conversion unit 3P and removes the signal light of TM0 from the first port 2A1. As a result, the optical detector 1D can remove the signal light of TE1 and the signal light of TE0 flowing backward from the waveguide-type PD 2.

Exemplified is a case in which the waveguide-type PD 2 includes two ports, that is, the first port 2A1 and the second port 2A2, but the number of the ports may be three or more. In this case, the mode removal unit is disposed for each port, and each mode removal unit passes signal light of each different mode to be output to the waveguide-type PD 2, and removes signal light of a mode flowing backward from the absorbing layer 12 in the waveguide-type PD 2.

For convenience of explanation, exemplified is a two-input structure of the waveguide-type PD 2 including the first port 2A1 connected to the first input waveguide 11A and the second port 2A2 connected to the second input waveguide 11B, but the embodiment is not limited thereto and can be appropriately changed. Additionally, exemplified is the waveguide-type PD 2 in which the first port 2A1 and the second port 2A2 are disposed in a linear shape, but the embodiment can be appropriately changed.

Figure 16A:
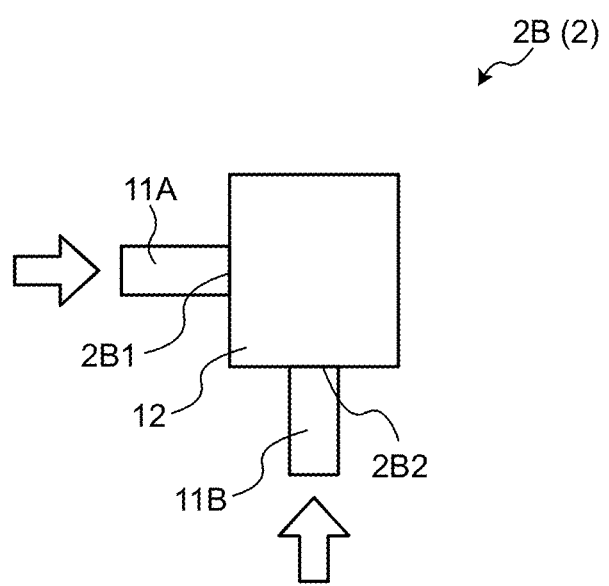
FIG. 16A is an explanatory diagram illustrating an example of a two-input waveguide-type PD.

FIG. 16A is an explanatory diagram illustrating an example of a two-input waveguide-type PD 2B. In the waveguide-type PD 2B illustrated in FIG. 16A, a second input port 2B2 may be disposed at a position at 90 degrees with respect to a first input port 2B1. Through the first input port 2B1, the signal light of the first mode is input, and the signal light of the second mode remaining in the absorbing layer 12 is output. Through the second input port 2B2, the signal light of the second mode is input, and the signal light of the first mode remaining in the absorbing layer 12 is output. The waveguide-type PD 2 in the present embodiment may be replaced with the waveguide-type PD 2B.

Figure 16B:
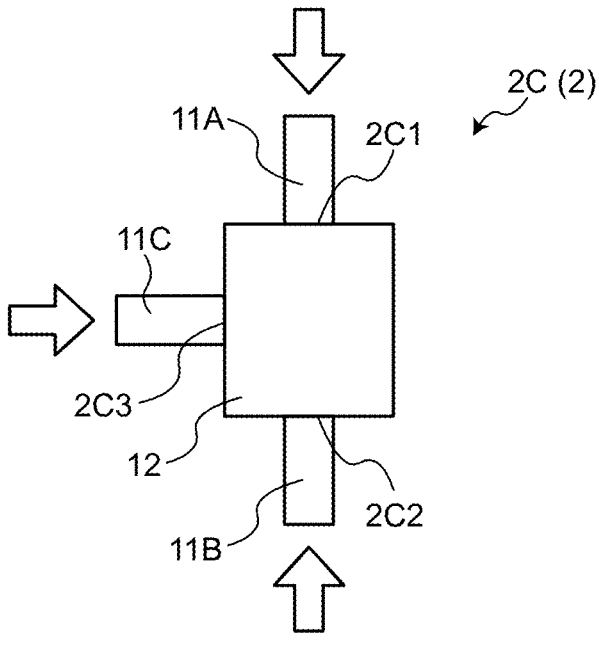
FIG. 16B is an explanatory diagram illustrating an example of a three-input waveguide-type PD.

FIG. 16B is an explanatory diagram illustrating an example of a three-input waveguide-type PD 2C. The waveguide-type PD 2C illustrated in FIG. 16B is a three-input waveguide-type PD including a first input port 2C1, a second input port 2C2, and a third input port 2C3 disposed at a position at 90 degrees with respect to the first input port 2C1 or the second input port 2C2. The waveguide-type PD 2 according to the present embodiment may be replaced with the waveguide-type PD 2C.

Figure 16C:
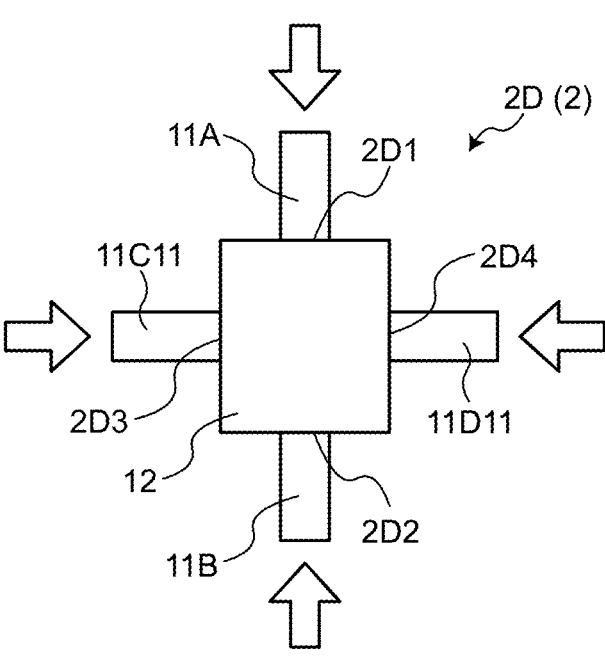
FIG. 16C is an explanatory diagram illustrating an example of a four-input waveguide-type PD.

FIG. 16C is an explanatory diagram illustrating an example of a four-input waveguide-type PD 2D. The waveguide-type PD 2D illustrated in FIG. 16C includes a first port 2D1 and a second port 2D2. Furthermore, the waveguide-type PD 2D includes a third port 2D3 disposed at a position at 90 degrees with respect to the first port 2D1 or the second port 2D2, and a fourth port 2D4 disposed linearly with respect to the third port 2D3. That is, the waveguide-type PD 2D is a four-input waveguide-type PD. The waveguide-type PD 2 according to the present embodiment may be replaced with the waveguide-type PD 2D. The following describes an optical detector 1E employing the four-input waveguide-type PD 2D as a sixth embodiment.

(f) Sixth Embodiment

Figure 17:
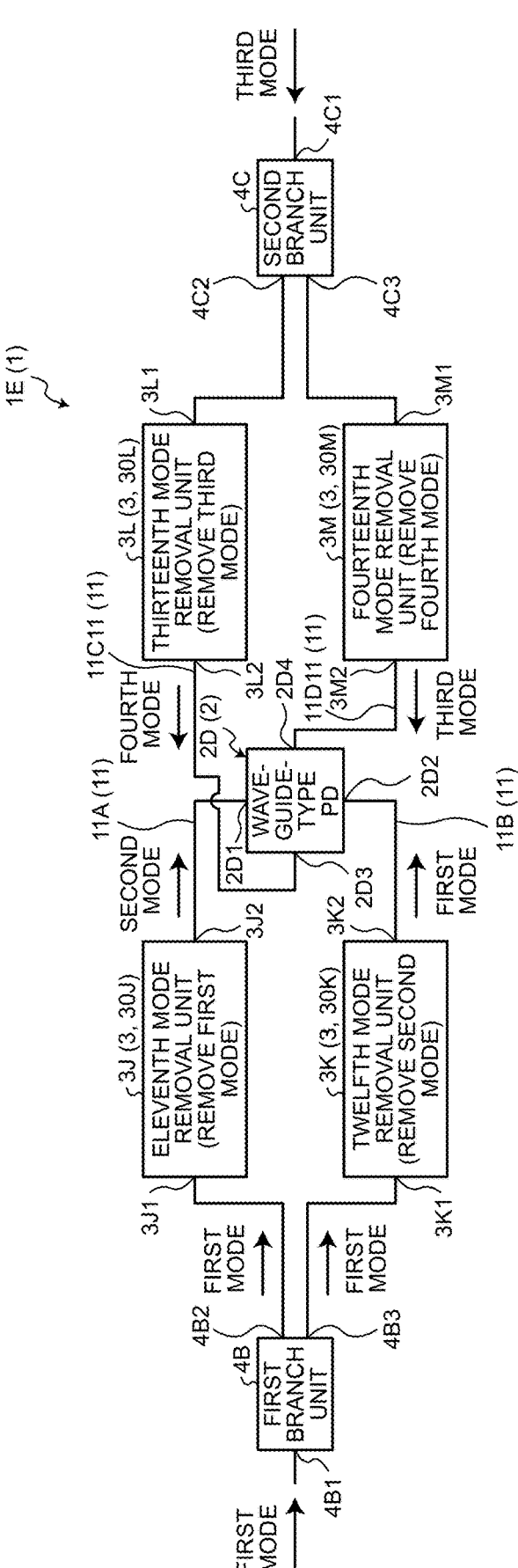
FIG. 17 is a block diagram illustrating an example of an optical detector according to a sixth embodiment.

FIG. 17 is a block diagram illustrating an example of the optical detector 1E according to the sixth embodiment. The optical detector 1E illustrated in FIG. 17 includes a first branch unit 4B, an eleventh mode removal unit 3J, a twelfth mode removal unit 3K, a second branch unit 4C, a thirteenth mode removal unit 3L, and a fourteenth mode removal unit 3M. The first branch unit 4B includes an input port 4B1, a first output port 4B2, and a second output port 4B3, and outputs the signal light of the first mode to the first output port 4B2 and the second output port 4B3 in a branched manner.

The eleventh mode removal unit 3J includes an eleventh input port 3J1, an eleventh filter 30J, and an eleventh output port 3J2. The eleventh filter 30J converts the signal light of the first mode input from the eleventh input port 3J1 into the signal light of the second mode, and removes the signal light of the first mode input from the eleventh output port 3J2. The twelfth mode removal unit 3K includes a twelfth input port 3K1, a twelfth filter 30K, and a twelfth output port 3K2. The twelfth filter 30K passes and outputs the signal light of the first mode input from the twelfth input port 3K1, and removes the signal light of the second mode input from the twelfth output port 3K2.

The waveguide-type PD 2D includes the first port 2D1 connected to the first input waveguide 11A and a second port 2D2 connected to the second input waveguide 11B. Furthermore, the waveguide-type PD 2D includes the third port 2D3 connected to a third input waveguide 11C11, the fourth port 2D4 connected to a fourth input waveguide 11D11, and the absorbing layer 12. The absorbing layer 12 converts the signal light of the second mode input from the first port 2D1 into electron-hole pairs, and converts the signal light of the first mode input from the second port 2D2 into electron-hole pairs. However, in a case in which part of the signal light of the second mode input from the first port 2D1 is not completely absorbed by the absorbing layer 12 and remains therein, residual signal light of the second mode is output to the second input waveguide 11B through the second port 2D2. Thus, the twelfth filter 30K in the twelfth mode removal unit 3K removes the signal light of the second mode from the twelfth output port 3K2.

Additionally, in a case in which part of the signal light of the first mode input from the second port 2D2 is not completely absorbed by the absorbing layer 12 and remains therein, residual signal light of the first mode is output to the first input waveguide 11A through the first port 2D1. Thus, the eleventh filter 30J in the eleventh mode removal unit 3J removes the signal light of the first mode from the eleventh output port 3J2.

The second branch unit 4C includes an input port 4C1, a first output port 4C2, and a second output port 4C3, and outputs signal light of a third mode to the first output port 4C2 and the second output port 4C3 in a branched manner.

The thirteenth mode removal unit 3L includes a thirteenth input port 3L1, a thirteenth filter 30L, and a thirteenth output port 3L2. The thirteenth filter 30L converts the signal light of the third mode input from the thirteenth input port 3L1 into signal light of a fourth mode, and removes the signal light of the third mode from the thirteenth output port 3L2. The fourteenth mode removal unit 3M includes a fourteenth input port 3M1, a fourteenth filter 30M, and a fourteenth output port 3M2. The fourteenth filter 30M passes and outputs the signal light of the third mode input from the fourteenth input port 3M1, and removes the signal light of the fourth mode from the fourteenth output port 3M2. The absorbing layer 12 converts the signal light of the fourth mode input from the third port 2D3 into electron-hole pairs, and converts the signal light of the third mode input from the fourth port 2D4 into electron-hole pairs.

In a case in which part of the signal light of the fourth mode input from the third port 2D3 is not completely absorbed by the absorbing layer 12 and remains therein, residual signal light of the fourth mode is output to the fourth input waveguide 11D11 through the fourth port 2D4. The fourteenth filter 30M in the fourteenth mode removal unit 3M removes the signal light of the fourth mode from the fourteenth output port 3M2.

Additionally, in a case in which part of the signal light of the third mode input from the fourth port 2D4 is not completely absorbed by the absorbing layer 12 and remains therein, residual signal light of the fourth mode is output to the third input waveguide 11C11 through the third port 2D3. The thirteenth filter 30L in the thirteenth mode removal unit 3L removes the signal light of the third mode from the thirteenth output port 3L2. As a result, the optical detector 1E can suppress passed light caused by backflow of the residual light in the absorbing layer 12.

The optical detector 1E according to the sixth embodiment includes the eleventh mode removal unit 3J, the twelfth mode removal unit 3K, the thirteenth mode removal unit 3L, and the fourteenth mode removal unit 3M. The eleventh mode removal unit 3J passes the signal light of the second mode to the first port 2D1, and removes the signal light of the first mode from the first port 2D1. The twelfth mode removal unit 3K passes the signal light of the first mode to the second port 2D2, and removes the signal light of the second mode from the second port 2D2. The thirteenth mode removal unit 3L passes the signal light of the fourth mode to the third port 2D3, and removes the signal light of the third mode from the third port 2D3. The fourteenth mode removal unit 3M passes the signal light of the third mode to the fourth port 2D4, and removes the signal light of the fourth mode from the fourth port 2D4. As a result, the optical detector 1E can suppress signal light intensity per cross section input to the four-input waveguide-type PD 2D, suppress deterioration of the response speed of the waveguide-type PD 2D, and suppress noise caused by backflow of the residual light that has not been absorbed by the waveguide-type PD 2D.

As described above, specific configurations have been described in the embodiments, but a method for converting a mode into a different mode and spatially separating different modes from each other is not limited to a specific method, and the embodiment can be appropriately changed.

The cross-sectional structure of the waveguide-type PD 2 is exemplified as the structure illustrated in FIG. 3, but is not limited thereto and can be appropriately changed. FIG. 18A to FIG. 18E are explanatory diagrams illustrating examples of the waveguide-type PD 2.

Figure 18A:
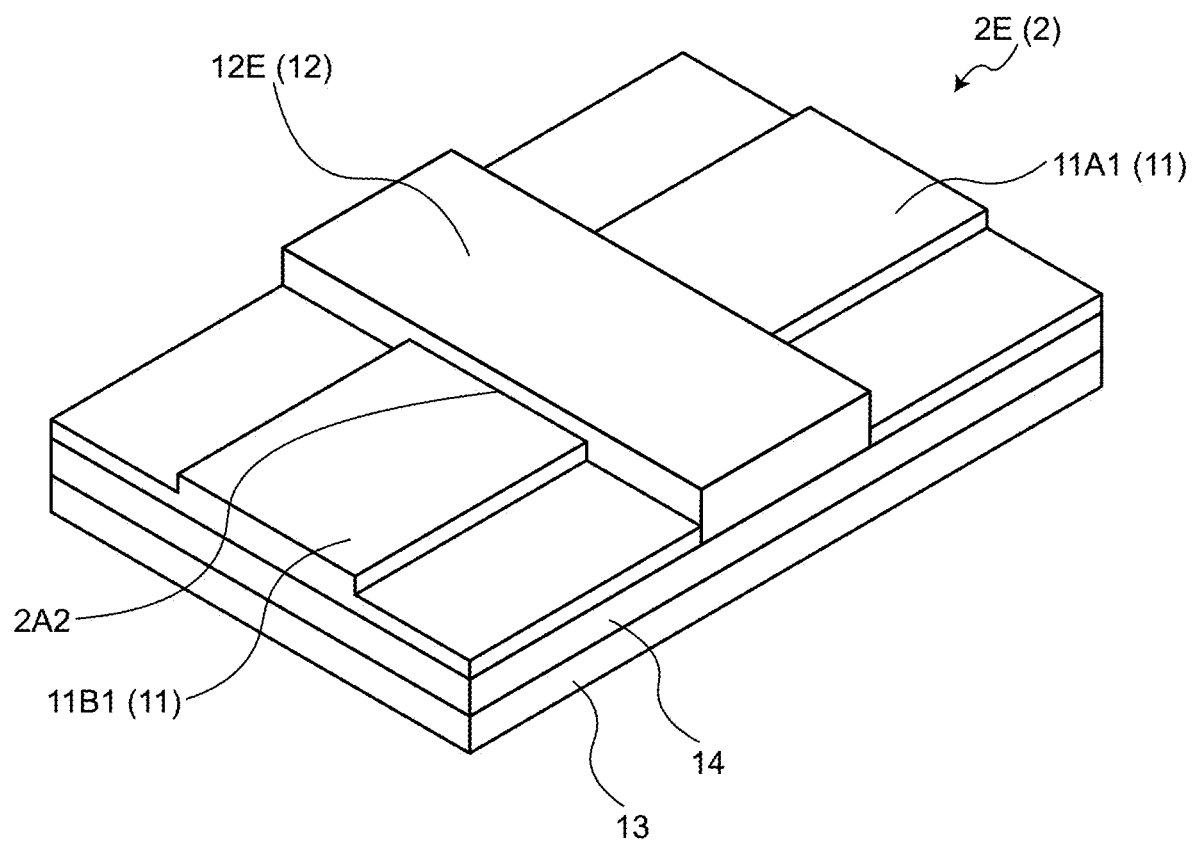
FIG. 18A is an explanatory diagram illustrating an example of the waveguide-type PD.

A waveguide-type PD 2E illustrated in FIG. 18A includes the Si substrate 13, the BOX layer 14 laminated on the Si substrate 13, the waveguide layer 11 laminated on the BOX layer 14, and a buffer layer (not illustrated) laminated on the waveguide layer 11. The waveguide layer 11 is a waveguide layer formed of Si or $Si_3N_4$, for example. The buffer layer is a layer of $SiO_2$, for example. The waveguide layer 11 includes a first input waveguide 11A1 and a second input waveguide 11B1. An absorbing layer 12E is disposed on the BOX layer 14. The absorbing layer 12 is an absorbing layer formed of Germanium (Ge), for example. The first input waveguide 11A1 and the second input waveguide 11B1 are disposed on the BOX layer 14. Even if the waveguide-type PD 2 according to the embodiment is replaced with the waveguide-type PD 2E, the same effect can be obtained.

Figure 18B:
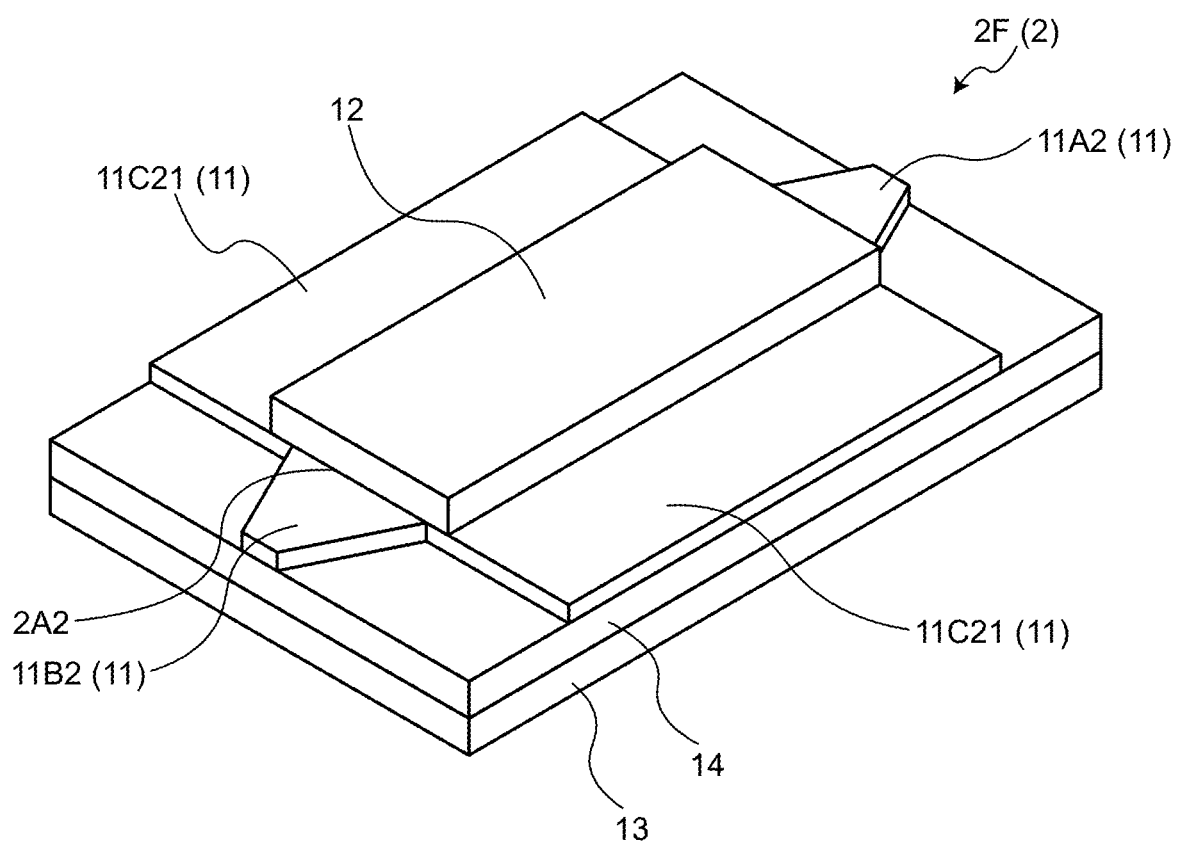
FIG. 18B is an explanatory diagram illustrating an example of the waveguide-type PD.

A waveguide-type PD 2F illustrated in FIG. 18B includes the Si substrate 13, the BOX layer 14, the waveguide layer 11 laminated on the BOX layer 14, and a buffer layer (not illustrated) laminated on the waveguide layer 11. The waveguide layer 11 includes a first input waveguide 11A2, a second input waveguide 11B2, and a waveguide 11C21 connecting the first input waveguide 11A2 with the second input waveguide 11B2. The absorbing layer 12 is disposed on the waveguide 11C21. The first input waveguide 11A2 and the second input waveguide 11B2 are disposed on the BOX layer 14. Even if the waveguide-type PD 2 according to the present embodiment is replaced with the waveguide-type PD 2F, the same effect can be obtained.

Figure 18C:
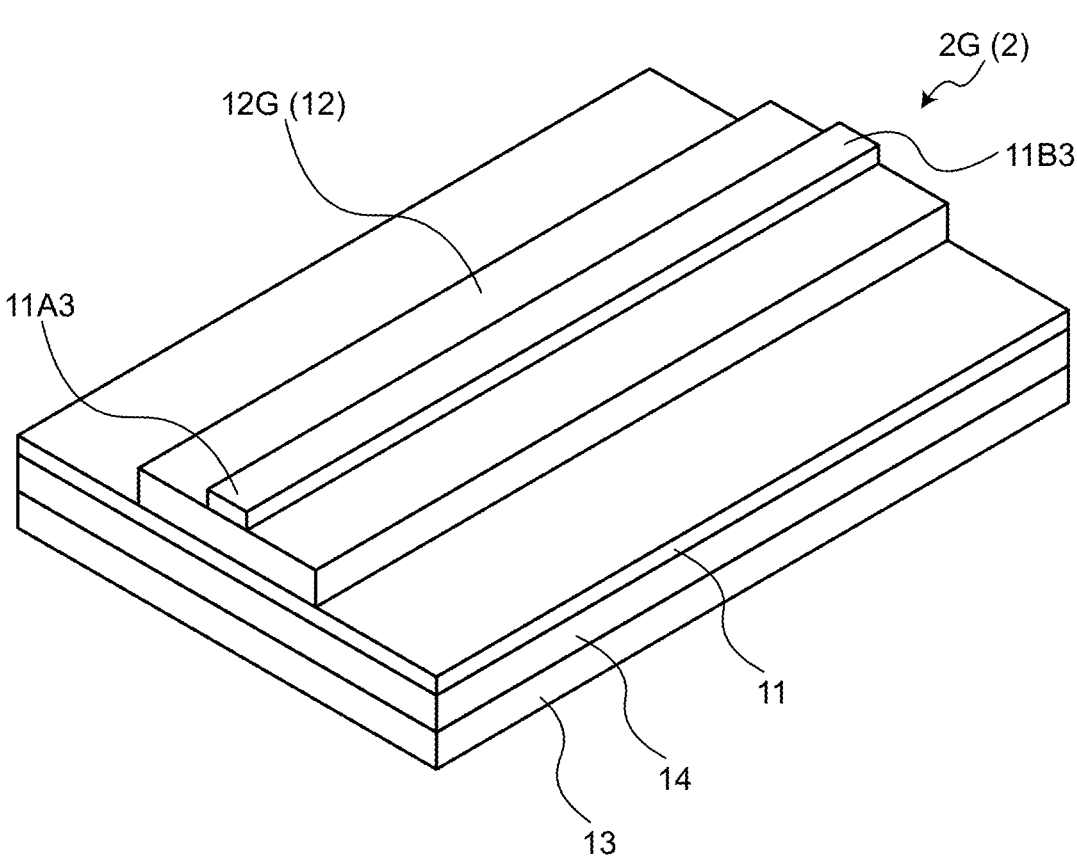
FIG. 18C is an explanatory diagram illustrating an example of the waveguide-type PD.

A waveguide-type PD 2G illustrated in FIG. 18C includes the Si substrate 13, the BOX layer 14, the waveguide layer 11 laminated on the BOX layer 14, and a buffer layer (not illustrated) laminated on the waveguide layer 11. An absorbing layer 12G is disposed on the waveguide layer 11. Furthermore, a waveguide 11G constituted of a first input waveguide 11A3 and a second input waveguide 11B3 is disposed on the absorbing layer 12G. Even if the waveguide-type PD 2 according to the present embodiment is replaced with the waveguide-type PD 2G, the same effect can be obtained.

Figure 18D:
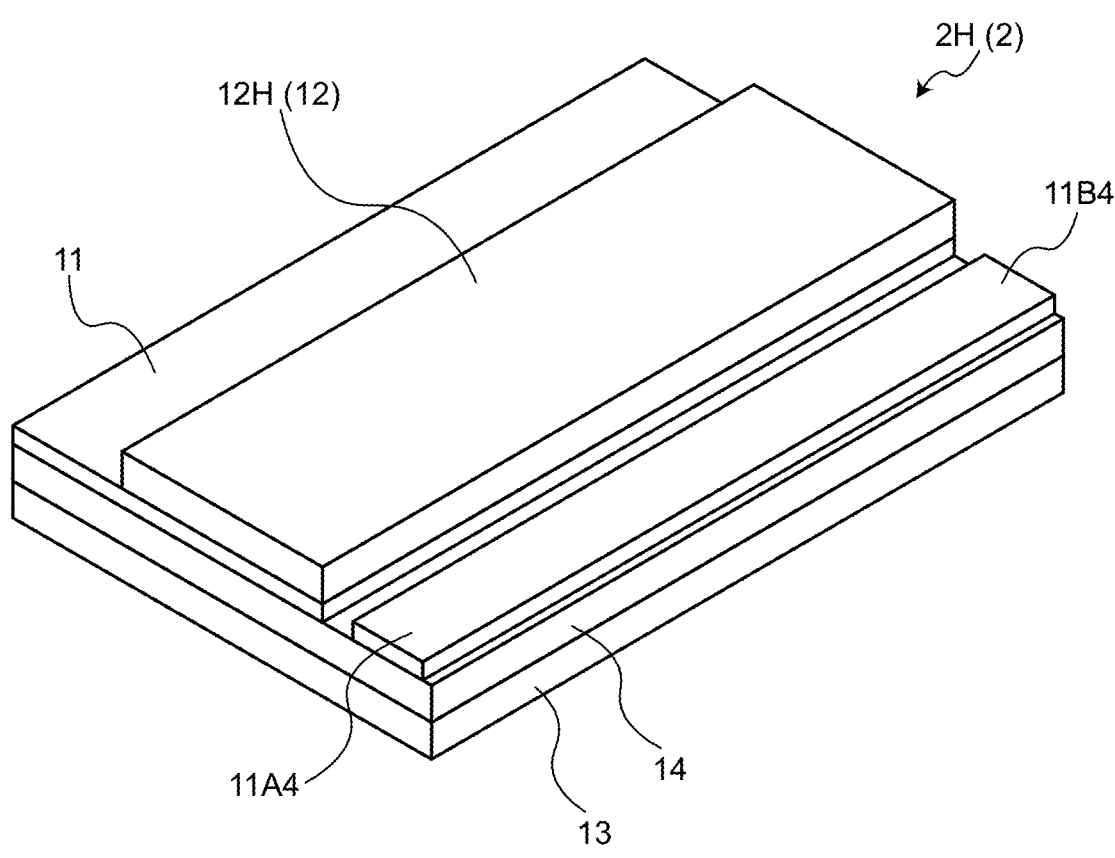
FIG. 18D is an explanatory diagram illustrating an example of the waveguide-type PD.

A waveguide-type PD 2H illustrated in FIG. 18D includes the Si substrate 13, the BOX layer 14, the waveguide layer 11 laminated on the BOX layer 14, and a buffer layer (not illustrated) laminated on the waveguide layer 11. An absorbing layer 12H is disposed on the waveguide layer 11. Furthermore, on the BOX layer 14, a waveguide 11H constituted of a first input waveguide 11A4 and a second input waveguide 11B4 is disposed to be parallel with the absorbing layer 12H at a predetermined interval. Even if the waveguide-type PD 2 according to the present embodiment is replaced with the waveguide-type PD 2H, the same effect can be obtained.

Figure 18E:
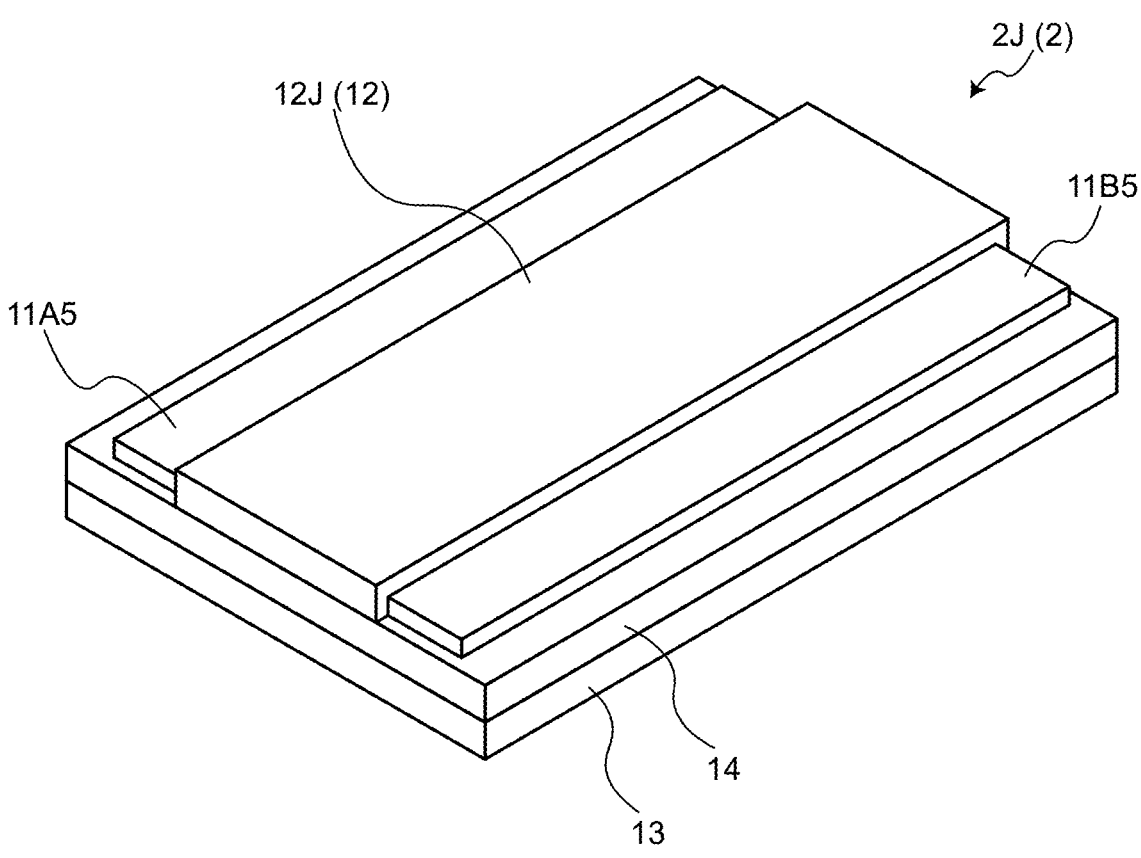
FIG. 18E is an explanatory diagram illustrating an example of the waveguide-type PD.

A waveguide-type PD 2J illustrated in FIG. 18E includes the Si substrate 13, the BOX layer 14, the waveguide layer 11 laminated on the BOX layer 14, and a buffer layer (not illustrated) laminated on the waveguide layer 11. An absorbing layer 12J is disposed on the waveguide layer 11. Furthermore, on the waveguide layer 11, a first input waveguide 11A5 and a second input waveguide 11B5 are disposed to be parallel with the absorbing layer 12J across the absorbing layer 12J. Even if the waveguide-type PD 2 according to the present embodiment is replaced with the waveguide-type PD 2J, the same effect can be obtained.

After spatially separating the residual light as a removal target, the mode filter 3 outputs the residual light from a port different from the input port. However, if reflection is caused thereafter, the light may return to the waveguide-type PD 2 again and impair a stable operation. Thus, by disposing an optical termination at a port different from the input unit, light reflection that causes such an adverse effect can be reduced.

The optical termination may have a structure of doping the waveguide to absorb light, a structure of causing the waveguide to have a tapered shape along the traveling direction of light to radiate the light to the outside of the waveguide, a structure of causing Ge to accumulate on the waveguide to absorb light, and the like, and the embodiment can be appropriately changed.

The waveguide may be, for example, a rib waveguide, a ridge waveguide, a rectangular waveguide, or a high-mesa waveguide. The rib waveguide is preferable because light is exuded to a slab portion, so that it is hardly affected by roughness of a side wall of a core and propagation with low loss can be achieved. The rectangular waveguide is preferable because loss is reduced even if a bend radius R is reduced because light confinement is strong. As the waveguide, a low-loss bending waveguide may be used, and the embodiment can be appropriately changed.

The waveguide may be a PLC in which both of a core and clad are $SiO_2$, an InP waveguide, or a GaAs waveguide. The waveguide may be an Si waveguide in which a lower clad is $SiO_2$, and an upper clad is $SiO_2$ or air, SiN, or the like. A case in which the waveguide is an Si waveguide is preferable because light confinement is strong due to a large specific refractive index difference, so that a low-loss bending waveguide can be implemented with the small bend radius R, that is, an optical device can be downsized. The absorbing layer 12 may be SiGe, for example, as well as Ge.

Figure 19:
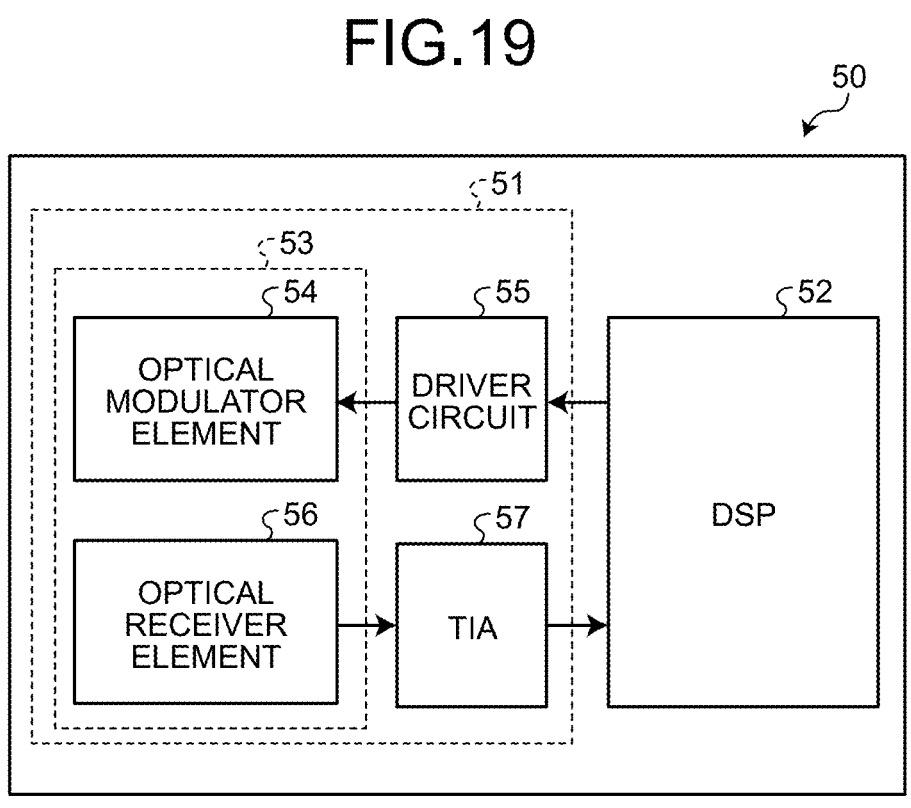
FIG. 19 is an explanatory diagram illustrating an example of an optical transceiver employing the optical detector.

Next, the following describes an optical transceiver 50 employing the optical detector 1 according to the present embodiment. FIG. 19 is an explanatory diagram illustrating an example of the optical transceiver 50 employing the optical detector 1. The optical transceiver 50 illustrated in FIG. 19 includes an optical transmitter-receiver 51 and a digital signal processor (DSP) 52. The optical transmitter-receiver 51 includes an optical modulator element 54, a driver circuit 55, an optical receiver element 56, and a transimpedance amplifier (TIA) 57. The DSP 52 controls the entire optical transmitter-receiver 51. The DSP 52 is an electric component that performs digital signal processing to perform IQ modulation processing for a transmission signal and demodulation processing for a reception signal.

For example, the DSP 52 performs processing such as encoding of transmission data, generates an electric signal including the transmission data, and outputs the generated electric signal to the driver circuit 55. The driver circuit 55 drives the optical modulator element 54 in response to the electric signal from the DSP 52. The optical modulator element 54 optically modulates signal light.

The optical receiver element 56 incorporates the optical detector 1 including the waveguide-type PD 2 that electrically converts the signal light. The TIA 57 amplifies the electric signal after the electric conversion, and outputs the electric signal after the amplification to the DSP 52. The DSP 52 performs processing such as decoding of the electric signal acquired from the TIA 57 to obtain reception data.

For convenience of explanation, exemplified is a case in which the optical transceiver 50 incorporates a communication element 53 including the optical modulator element 54 and the optical receiver element 56, but the optical transceiver 50 may be an optical receiver incorporating only the optical receiver element 56. The embodiment can be appropriately changed.

The constituent elements of the units illustrated in the drawings are not necessarily physically configured as illustrated in the drawings. That is, specific forms of distribution and integration of the units are not limited to those illustrated in the drawings. All or part thereof may be functionally or physically distributed/integrated in arbitrary units depending on various loads, usage states, and the like.

Furthermore, all or optional part of various kinds of processing functions performed by each device may be performed on a central processing unit (CPU) (or a microcomputer such as a micro processing unit (MPU) or a micro controller unit (MCU). Obviously, all or optional part of the various kinds of processing functions may be performed on a computer program that is analyzed and executed by the CPU (or a microcomputer such as an MPU or an MCU), or on hardware using wired logic.

According to one aspect, backflow of residual light in a photodetector can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical detector comprising:
a photodetector that converts signal light into an electric signal and includes two or more ports; and
a mode filter including two or more ports, wherein
the photodetector includes:
a first port to which signal light of a first mode is input; and
a second port to which signal light of a second mode is input,
the mode filter includes:
a third port connected to the first port; and
a fourth port connected to the second port, and the mode filter
passes the signal light of the first mode towards the first port to be output from the third port,
passes the signal light of the second mode towards the second port to be output from the fourth port, removes the signal light of the second mode to be input from the third port, the signal light of the second mode being output from the first port, and
removes the signal light of the first mode to be input from the fourth port, the signal light of the first mode being output from the second port.

2. The optical detector according to claim 1, wherein the mode filter
passes the signal light of the first mode towards the first port to be output from the third port,
passes the signal light of the second mode towards the second port to be output from the fourth port,
removes signal light including the signal light of the second mode other than the signal light of the first mode to be input from the third port, the signal light including the signal light of the second mode being output from the first port, and
removes signal light including the signal light of the first mode other than the signal light of the second mode to be input from the fourth port, the signal light including the signal light of the first mode being output from the second port.

3. The optical detector according to claim 1, wherein the mode filter includes:
a first mode remover that is connected to the third port, passes the signal light of the first mode, and removes the signal light of the second mode from the first port; and
a second mode remover that is connected to the fourth port, passes the signal light of the second mode, and removes the signal light of the first mode from the second port.

4. The optical detector according to claim 3, wherein the mode filter
includes a branch coupler that causes the signal light of the first mode to branch,
the first mode remover
passes the signal light of the first mode from the branch coupler, and removes the signal light of the second mode from the second port, and
the second mode remover
converts the signal light of the first mode from the branch coupler into the signal light of the second mode, passes the signal light of the second mode after being converted, and removes the signal light of the first mode from the first port.

5. The optical detector according to claim 4, wherein the first mode remover
includes a first adiabatic converter that passes the signal light of the first mode from the branch coupler and removes the signal light of the second mode from the second port, and
the second mode remover includes:
a second adiabatic converter that converts the signal light of the first mode from the branch coupler into the signal light of the second mode; and
a tapered waveguide that passes the signal light of the second mode after being converted by the second adiabatic converter, and removes the signal light of the first mode from the first port.

6. The optical detector according to claim 1, wherein the mode filter includes:
a mode converter that converts the signal light of the first mode into the signal light of the first mode and the signal light of the second mode to be output; and a mode remover including a third port connected to the first port and a fourth port connected to the second port, and the mode remover passes the signal light of the first mode towards the first port to be output from the third port, passes the signal light of the second mode towards the second port to be output from the fourth port, removes the signal light of the second mode from the first port input from the third port, and removes the signal light of the first mode from the second port input from the fourth port.

7. The optical detector according to claim 6, wherein the mode converter includes a Y-branch waveguide that converts the signal light of the first mode into the signal light of the first mode and the signal light of the second mode to be output, and the mode remover includes a directional coupler that passes the signal light of the first mode from the Y-branch waveguide and removes the signal light of the second mode from the first port, and passes the signal light of the second mode from the Y-branch waveguide and removes the signal light of the first mode from the second port.

8. The optical detector according to claim 1, wherein the mode filter includes:

a mode converter that converts the signal light of the first mode into the signal light of the first mode and the signal light of the second mode to be output; and a mode remover including a fifth port connected to the first port and a sixth port connected to the second port, and the mode remover passes the signal light of the first mode towards the first port to be output from the fifth port, passes the signal light of the second mode towards the second port to be output from the sixth port, removes the signal light of the second mode from the first port input from the fifth port, and removes the signal light of the first mode from the second port input from the sixth port.

9. The optical detector according to claim 8, wherein the mode converter includes a Y-branch waveguide that converts the signal light of the first mode into the signal light of the first mode and the signal light of the second mode to be output, and the mode remover includes:

a tapered waveguide that passes the signal light of the first mode from the Y-branch waveguide, and converts the signal light of the second mode from the Y-branch waveguide into signal light of a third mode; and an adiabatic converter that passes the signal light of the third mode from the tapered waveguide and removes the signal light of the first mode from the second port, and passes the signal light of the first mode from the tapered waveguide and removes the signal light of the third mode from the first port.

10. The optical detector according to claim 1, wherein the photodetector includes:

a fifth port to which signal light of a third mode is input; and a sixth port to which signal light of a fourth mode is input, the mode filter includes:

a seventh port connected to the fifth port; and an eighth port connected to the sixth port, and the mode filter passes the signal light of the third mode towards the fifth port to be output from the seventh port, passes the signal light of the fourth mode towards the sixth port to be output from the eighth port, removes the signal light of the fourth mode from the fifth port input from the seventh port, and removes the signal light of the third mode from the sixth port input from the eighth port.

11. An optical receiver comprising an optical receiver element that receives an electric signal from signal light using light, wherein the optical receiver element includes an optical detector including:

a photodetector that converts the signal light into an electric signal and includes two or more ports; and a mode filter including two or more ports, the photodetector includes:

a first port to which signal light of a first mode is input; and a second port to which signal light of a second mode is input, the mode filter includes:

a third port connected to the first port; and a fourth port connected to the second port, and the mode filter passes the signal light of the first mode towards the first port to be output from the third port, passes the signal light of the second mode towards the second port to be output from the fourth port, removes the signal light of the second mode to be input from the third port, the signal light of the second mode being output from the first port, and removes the signal light of the first mode to be input from the fourth port, the signal light of the first mode being output from the second port.

12. An optical transceiver comprising:

an optical modulator element that transmits transmission light by optically modulating light using a transmission signal; and an optical receiver element that receives reception signal from received light using light, wherein the optical receiver element includes an optical detector including:

a photodetector that converts the received light into a reception signal and includes two or more ports; and a mode filter including two or more ports, the photodetector includes:

a first port to which signal light of a first mode is input; and a second port to which signal light of a second mode is input, the mode filter includes:

a third port connected to the first port; and a fourth port connected to the second port, and the mode filter passes the signal light of the first mode towards the first port to be output from the third port, passes the signal light of the second mode towards the second port to be output from the fourth port, removes the signal light of the second mode to be input from the third port, the signal light of the second mode being output from the first port, and removes the signal light of the first mode to be input from the fourth port, the signal light of the first mode being output from the second port.

\* \* \* \* \*